United States Patent [19]

Abraham

[11] Patent Number: 5,280,081
[45] Date of Patent: * Jan. 18, 1994

[54] HIGHLY HYDROGENATED NONFUNCTIONAL OR FUNCTIONAL TERMINATED CONJUGATED DIENE POLYMERS

[75] Inventor: Tonson Abraham, Strongsville, Ohio

[73] Assignee: The B. F. Goodrich Company, Akron, Ohio

[*] Notice: The portion of the term of this patent subsequent to Mar. 12, 2008 has been disclaimed.

[21] Appl. No.: 819,420

[22] Filed: Jan. 10, 1992

Related U.S. Application Data

[63] Continuation-in-part of Ser. No. 710,622, Jun. 5, 1991.

[51] Int. Cl.$^5$ .............................................. C08F 8/04
[52] U.S. Cl. ............................... 525/339; 525/326.2; 525/326.7; 525/328.4; 525/329.4; 525/330.3; 525/332.8; 525/332.9; 525/333.1; 525/333.2; 525/338
[58] Field of Search ............................... 525/338, 339

[56] References Cited

U.S. PATENT DOCUMENTS

| 2,836,583 | 5/1958 | Crawford, Jr. . |
| 2,951,063 | 8/1960 | Bolstad et al. . |
| 2,951,064 | 8/1960 | Lo . |
| 2,951,065 | 8/1960 | Lo . |
| 2,975,164 | 3/1961 | Crawford et al. . |
| 2,979,489 | 4/1961 | Lo . |
| 3,218,303 | 11/1965 | Anderson et al. . |
| 3,308,175 | 3/1967 | Barr . |
| 3,379,773 | 4/1968 | Barr . |
| 3,398,128 | 8/1968 | Bolstad et al. . |

(List continued on next page.)

FOREIGN PATENT DOCUMENTS

| 0360356 | 3/1990 | European Pat. Off. . |
| 42-13615 | 8/1967 | Japan . |
| 51-061593 | 5/1976 | Japan . |
| 53-026890 | 3/1978 | Japan . |
| 62-151404 | 7/1987 | Japan . |

(List continued on next page.)

OTHER PUBLICATIONS

Chemical Abstracts vol. 68, 1968, pp. 7696, 79692n.
A paper entitled "Oil-Resistant Rubbers from 2--Methyl Vinyl Pyridine," J. E. Pritchard & M. H. Opheim. *Industrial & Engineering Chem.*, 1954, vol. 46, pp. 2242-2245.
A paper entitled "Butadiene-2-Methyl-5-vinylpyridine Rubbers for General Purpose Use," H. E. Rails-
(List continued on next page.)

*Primary Examiner*—Bernard Lipman
*Attorney, Agent, or Firm*—Hudak & Shunk Co.

[57] ABSTRACT

In a first embodiment of the present invention, poisoning or deactivation of conventional homogeneous catalysts to be used in hydrogenation of the backbone unsaturation in liquid monofunctional and difunctional-terminated conjugated diene polymers, is prevented by reacting a blocking agent compound with the functional end groups present in these polymers. More specifically, subsequent to formation of a selected starting material monofunctional or difunctional-terminated conjugated diene polymer, a suitable blocking agent is reacted with the functional end groups of the polymer enabling relatively inexpensive titanium, iron, cobalt, or nickel-based homogeneous catalysts to be used in hydrogenating the backbone unsaturation of the polymer to a high degree. Subsequent to hydrogenation, the polymer is subjected to conventional hydrolysis using a mineral acid or base to remove the blocking groups and return the hydrogenated conjugated diene polymer to its original functionality. In a second embodiment, conventional homogeneous catalysts based on cobalt, nickel, titanium, or iron are utilized to hydrogenate low molecular weight liquid copolymers and homopolymers to a high degree. More particularly, butadiene-alkenylpyridine and butadiene-acrylate liquid copolymers and butadiene homopolymers are formed in a conventional manner are hydrogenated using such catalysts.

27 Claims, 16 Drawing Sheets

U.S. PATENT DOCUMENTS

| | | |
|---|---|---|
| 3,416,899 | 12/1968 | Schiff . |
| 3,531,450 | 9/1970 | Yoshimoto et al. . |
| 3,562,341 | 2/1971 | Tarrant et al. . |
| 3,607,850 | 9/1971 | Smith . |
| 3,625,927 | 12/1971 | Yoshimoto et al. . |
| 3,673,281 | 6/1972 | Bronstert et al. . |
| 3,766,300 | 10/1973 | De La Mare . |
| 3,988,504 | 10/1976 | Halasa . |
| 4,098,991 | 4/1978 | Kang . |
| 4,866,120 | 9/1989 | Rudnick et al. . |
| 4,999,405 | 3/1991 | Abraham . |

FOREIGN PATENT DOCUMENTS

| | | |
|---|---|---|
| 62-151405 | 7/1987 | Japan . |
| 62-218410 | 9/1987 | Japan . |
| 63-027521 | 2/1988 | Japan . |
| 63-057626 | 3/1988 | Japan . |
| 1-289806 | 11/1989 | Japan . |
| 8808856 | 11/1988 | PCT Int'l Appl. . |

OTHER PUBLICATIONS bach & C. C. Biard, Industrial Eng. Chem., 1957, vol. 49, pp. 1043–1050.

A paper entitled "Pyridinium High Polymers—A New Class of Oil-Resistant Synthetic Rubbers"; W. B. Reynold, J. E. Pritchard, M. H. Opheim & G. Kraus. Proceedings of The Third Tech. Conf., 1956, pp. 226–240.

A paper entitled "Technical Report 68–56–CM," D. I. Relyea, H. P. Smith, A. N. Johnson, *Polymerization Studies Leading to High-Strength, Chemical-Resistant Elastomers Serviceable at Temperature Extremes*, Feb. 1968, p. 8.

A paper entitled "Principles of Elastomer Synthesis," H. F. Mark, *Journal of Applied Polymer Science: Applied Polymer Symposium 39, 1–19* (1984).

An article entitled "The Hydrogenation of HO-Terminated Telechelic Polybutadienes in the Presence of a Homogeneous Hydrogenation Catalyst Based on Tris (triphenylphosphine) rhodium Chloride," by Karel Bouchal, Michal Ilavsky, and Eva Zurkova, Institute of Macromolecular Chemistry 165 (1989) 165–180 (Nr. 7216), Czechoslovak Academy of Sciences.

PMR SPECTRUM
DIHYDROXY TERMINATED POLYBUTADIENE
REFERENCE: TETRAMETHYLSILANE (0.00 PPM)

PMR SPECTRUM
HYDROGENATED DIACETOXY TERMINATED POLYBUTADIENE
REFERENCE: TETRAMETHYLSILANE (0.00 PPM)

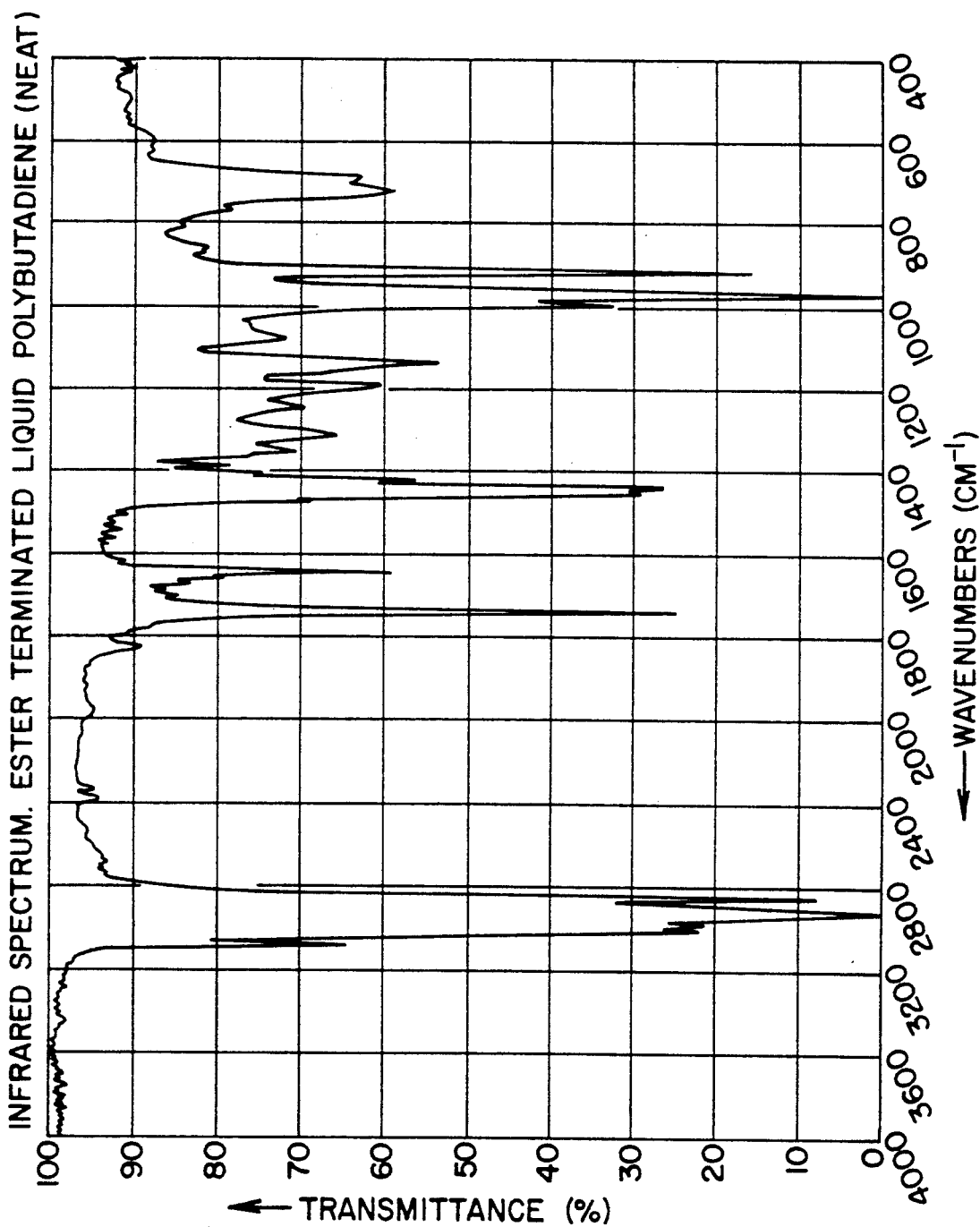

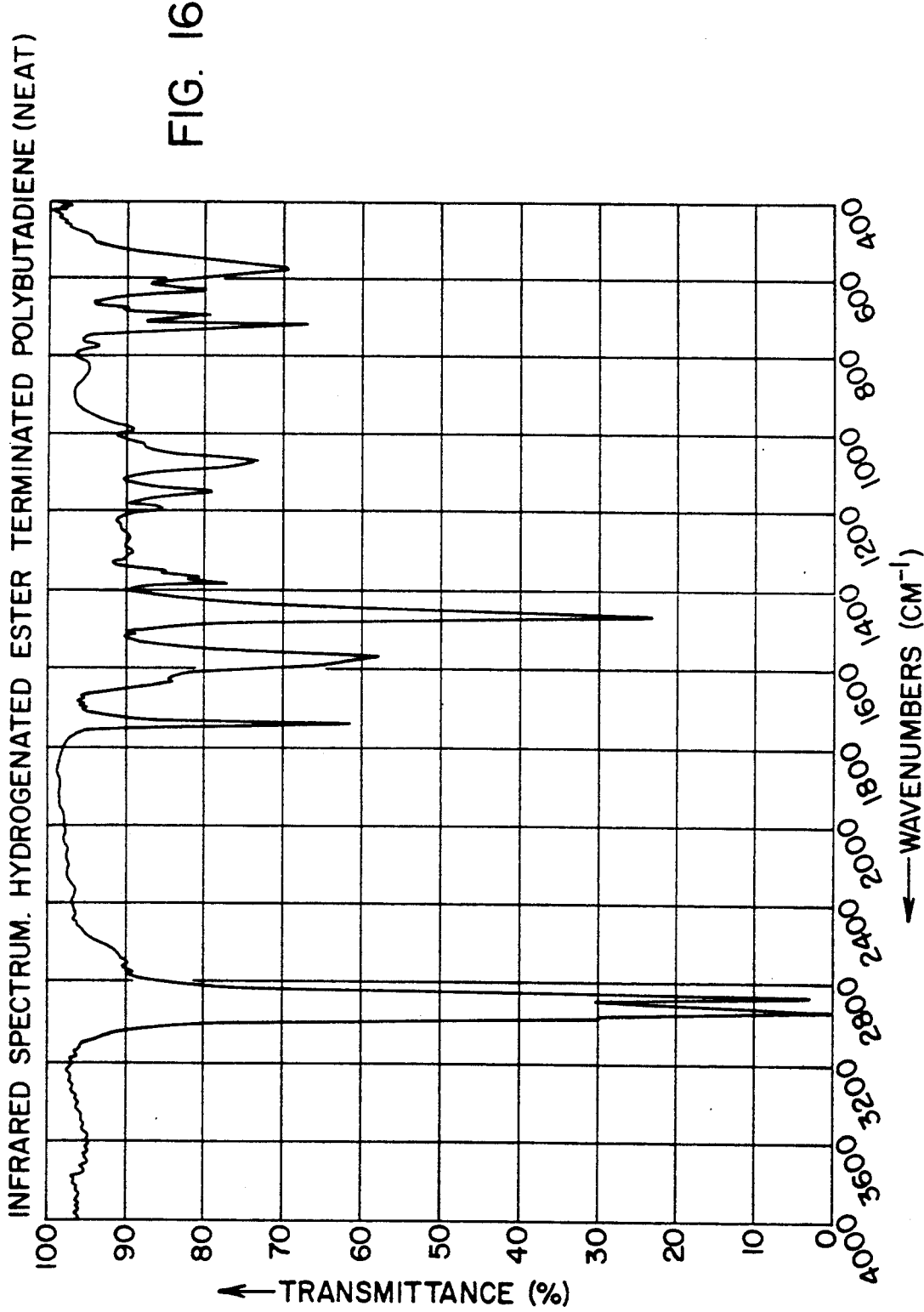

HIGHLY HYDROGENATED NONFUNCTIONAL OR FUNCTIONAL TERMINATED CONJUGATED DIENE POLYMERS

CROSS REFERENCE

This application is a continuation-in-part of U.S. patent application Ser. No. 07/710,622, filed Jun. 5, 1991, for "Highly Hydrogenated Functional-Terminated Conjugated Diene polymers."

FIELD OF THE INVENTION

The invention relates to highly hydrogenated nonfunctional or functional-terminated conjugated diene polymers, and in particular to liquid nonfunctional, monofunctional and difunctional-terminated conjugated diene polymers and copolymers which are hydrogenated to a high degree using conventional, relatively inexpensive homogeneous catalysts.

BACKGROUND

Nonfunctional, monofunctional and difunctional-terminated liquid homopolymers derived from butadiene and isoprene monomers are suitable for a variety of applications in the polymer industry, and are particularly desirable due to their relatively low cost. However, the presence of unsaturation in the aliphatic hydrocarbon backbones of these monomers render the polymers produced therefrom thermooxidatively unstable. That is, such polymers are susceptible to breakdown through oxidation catalyzed by heat. However, by hydrogenating the unsaturation present in these polymers to a high degree, the thermooxidative stability of the polymers can be substantially improved. More particularly, removal of at least about 95 percent of the unsaturation in nonfunctional, monofunctional and difunctional-terminated polybutadiene or polyisoprene significantly improves their thermooxidative stability, and saturation of at least about 99 percent of the backbone double bonds results in a polymer having superior thermooxidative stability.

Catalytic hydrogenation is a conventional way of obtaining saturated materials from nonfunctional, monofunctional and difunctional-terminated conjugated diene polymers. However, cost-effective heterogeneous catalysts, such as Raney nickel, which are suitable for the hydrogenation of most monomers are, in general, unsuitable for hydrogenation of nonfunctional, monofunctional and difunctional-terminated conjugated diene polymers to a high degree, presumably due to the inaccessibility of the polymer backbone to the catalyst. This inaccessibility is due to the coiled conformation that these polymers assume. In some instances, specially prepared heterogeneous noble metal catalysts with a high surface area, such as rhodium and palladium-based heterogeneous catalysts, have been shown to be successful in such an application, but are not cost-effective due to their inherent high cost as well as increased expense related to the special preparation of these catalysts. As alluded to above, in order for a hydrogenation catalyst to be effective, intimate contact between the catalyst and the polymer backbone is necessary. Hence, preferred catalysts for the hydrogenation of these polymers are homogeneous rather than heterogeneous, since such homogeneous catalysts achieve this intimate contact.

Rhodium and palladium-based homogeneous catalysts, and in particular tristriphenylphosphinerhodium (I) chloride, have heretofore been the catalysts of choice for hydrogenating functional-terminated conjugated diene polymers. These catalysts are chosen because they achieve intimate contact with the polymer backbone and further because they are unaffected by the functional groups of the polymers, resulting in a high degree of hydrogenation of the unsaturated polymer backbone. However, rhodium and palladium-based homogeneous catalysts are very expensive. Although more conventional homogeneous catalysts based on titanium, iron, cobalt, or nickel are generally about 1,000 times less expensive than the rhodium or palladium-based homogeneous catalysts, these conventional homogeneous catalysts are easily deactivated or "poisoned" in the presence of certain functional groups in the polymer being hydrogenated. For example, a cobalt-based homogeneous catalyst would undergo oxidative addition with the terminal hydroxy groups of a monofunctional or difunctional hydroxy-terminated polybutadiene polymer, thereby causing chain extension and subsequent gelation of a solution of the polymer, thus making the polymer unsuitable for hydrogenation. Aluminum trialkyls, which are commonly used reductants in the formation of active cobalt species, would also exert a similar effect on the polymer.

Japanese Patent 62151404 relates to hydroxy-containing diene polymers which are catalytically hydrogenated in solvents, then treated with alcohols to separate highly-hydrogenated polymers from low or non-hydrogenated polymers. Thus, 300 g of OH-terminated polyisoprene was hydrogenated over Ni-diatomaceous earth in hexane at 130° and 50 kg/cm$^2$-gage H for 4 hours, then shaken with 400 cm$^3$ iso-PrOH and left to stand to separate into two layers, the top of which contained 103 g of 97 percent hydrogenated polymer and the bottom of which contained 200 g of 56 percent hydrogenated polymer.

Japanese Patent 62151405 relates to OH-terminated diene polymers which are catalytically hydrogenated in high yield by solution hydrogenation, treatment with alcohols, and rehydrogenation of the resulting dark solution. Thus, 300 g of OH-terminated polyisoprene was hydrogenated in n-hexane with a Ni-kieselguhr catalyst and the solution treated with 400 g of 2-propanol to form transparent (hydrogenated to 97 percent) and dark-colored (hydrogenated to 56 percent) fractions. The colored fraction was rehydrogenated to obtain a hydrogenation ratio of 67 percent.

Japanese Patent 53026890 relates to using Raney Ni catalysts, to hydrogenate OH-containing unsaturated hydrocarbon polymers in alcohols or mixtures of alcohols and other organic solvents. Thus, 50 g of polybutadiene polyol (having a number average molecular weight of 3100 and an OH value of 0.82 mequiv./g) 50 g of iso-PrOH, and 5 g of Raney Ni catalyst were hydrogenated for 6 hours at 150° and 50 kg/cm$^2$ H pressure in an autoclave to give 50 parts polymer (having 0.83 mequiv./g OH value). The hydrogenation degree was 63.8 percent, as compared with 19.5 percent when cyclohexane was used instead of iso-PrOH.

Moreover, low molecular weight liquid conjugated diene-acrylonitrile copolymers are useful as additives in the processing of plastic and rubber polymers. It is well known to the art and to the literature that both the hydrocarbon and polar segments in such copolymers are essential for compatibility with the polymers being modified. In addition, the polar groups also aid in preventing additives, such as antioxidants, from migrating to the surface of the finished polymer product. However, such liquid copolymers have a major drawback associated with their use as additives, namely, their thermooxidative instability caused by unsaturation of the backbone and pendant vinyl groups resulting from the copolymeriztion of the conjugated diene. However, it has been found that the thermooxidative stability of such copolymers is significantly improved if the unsaturated copolymer is hydrogenated. Selective hydrogenation of the olefinic sites derived from the conjugated diene without affecting the unsaturation of the polar nitrile groups, results in a thermooxidatively stable polymer which retains the polar character of the unhydrogenated starting material. However, conventional low-cost homogeneous hydrogenation catalysts based on cobalt or nickel are unacceptable as hydrogenation catalysts for conjugated diene-acrylonitrile copolymers due to the tendency of the nitrile groups to undergo reduction, which results in loss of the polar character of the nitrile groups and hence the copolymer. Moreover, such reduction of the nitrile groups leads to undesirable crosslinking reactions during hydrogenation, yielding an unsuitable gelled product.

Heretofore, hydrogenation of such conjugated-acrylonitrile copolymers, and more particularly, selective hydrogenation of the olefinic sites derived from the conjugated diene without attendant unsaturation of the polar nitrile groups, has been achieved by the use of heterogeneous catalysts based on rhodium. Since such noble transition metal catalysts generally are about 1,000 times more expensive than cobalt or nickel, the high cost of the catalyst is reflected in the selling price of the end product, which is undesirable.

Unexpectedly, it has been found that the unsaturation derived from butadiene in butadiene-alkenylpyridine and butadiene-acrylate liquid copolymers can be selectively hydrogenated to a high degree using conventional homogenous catalysts based on cobalt or nickel. The choice of the pendant polar pyridyl and ester groups is due to the fact that these groups are much more difficult to hydrogenate than, say, the nitrile group in the butadiene-acrylonitrile copolymer discussed immediately above. These results are unexpected since addition of an unmodified homogeneous nickel or cobalt catalyst to the solution of a high molecular weight butadiene-alkenylpyridine or butadiene-acrylate copolymer causes gel formation, and it is well known to those having ordinary skill in the art that a gelled polymer cannot be hydrogenated to a high degree. Such gelation typically is due to crosslinking of the polymer by the catalyst via complexation with the polar pyridine nitrogen atoms and polar ester groups. In high molecular weight copolymers, as little as one or two crosslinks per 200 to 300 monomer units can cause gelation. However, in the low molecular weight liquid copolymers of the present invention, a much higher degree of chain extension and crosslinking must take place in order to cause gel formation. Thus, upon addition of an unmodified homogenous nickel or cobalt catalyst to the liquid copolymer, gelation unexpectedly does not occur. Hydrogenation then allows removal of the backbone and pendant unsaturation in the liquid copolymers of this invention without hydrogenation of the pendant polar pyridyl and ester groups. Thus, the thermooxidative stability of the liquid copolymers is improved, while the polar character of these materials is retained. Moreover, the retained polarity resulting from the pendant polar pyridyl and ester groups imparts compatibility to the copolymers for use as modifiers in other materials such as plastics and rubbers.

U.S. Pat. No. 3,416,899 (Schiff, Dec. 17, 1968) relates to improved gel compositions useful as incendiary fuels, as solid fuels for heating, as a fracturing liquid for subterranean formations, and the like. In another aspect, this reference relates to the preparation of hydrocarbon gel compositions by hydrogenating a hydrocarbon solution of an unsaturated rubbery polymer in the presence of a catalyst comprising a reducing metal compound and a salt of a Group VIII metal.

U.S. Pat. No. 3,673,281 (Bronstert et al., Jun. 27, 1972) relates to a process for the hydrogenation of polymers containing double bonds in solution and in the presence of a catalyst complex comprising:

A. a compound of iron, cobalt or nickel,
B. an organo-aluminum compound, and
C. hexaalkylphosphhoric acid triamide as activator.

Polymers of diene hydrocarbons contain double bonds in the backbone. These double bonds may be hydrogenated by conventional processes. Products which are wholly or partly hydrogenated in this way are superior to non-hydrogenated polymers in that they possess improved resistance to aging and are particularly resistant to oxidative degradation. In the case of block copolymers of dienes and vinyl aromatic compounds, in particular, the hydrogenated products also show improved tensile properties and mechanical strength. When only partially hydrogenated, the diene polymers may be vulcanized. Such vulcanizates possess a higher tensile strength and a lower glass temperature than vulcanizates of non-hydrogenated diene polymers.

U.S. Pat. No. 3,625,927 (Yoshimoto et al, Dec. 7, 1971) relates to a catalyst for hydrogenating a high molecular weight polymer having hydrogenatable unsaturated bonds. This catalyst is suitable for hydrogenation of the polymer is a viscous solution form and comprises a reaction product of (1) a metal chelate compound of nickel, cobalt, or iron, with (2) an organic metallic reducing agent in said chelate compound. The chelating agent is attached to the metal by a pair of nitrogen atoms and an oxygen atom.

U.S. Pat. No. 3,531,450 (Yoshimoto et al, Sep. 29, 1970) relates to a new hydrogenation catalyst consisting of three catalytic components and a process for hydrogenating polymers by the use of said catalyst. This three-component catalyst consists of (1) at least one kind of an unsaturated hydrocarbon selected from the group consisting of an olefinically unsaturated hydrocarbon and an acetylenically unsaturated hydrocarbon, (2) at least one kind of an organic compound of the metal selected from the group consisting of nickel, cobalt and iron, and (3) at least one kind of a metal compound reducing agent.

U.S. Pat. No. 3,766,300 (De La Mare, Oct. 16, 1973) discloses a process for the hydrogenation of copolymers prepared from conjugated dienes and certain copolymerizable polar monomers such as vinyl pyridines, acrylonitriles, and alpha-olefin oxides which comprises an initial step of forming a complex between at least one Lewis acid and the polar portions of the copolymer and thereafter subjecting the complex to hydrogenation. More particularly, this reference is especially concerned with a process for the hydrogenation of block copolymers derived from these monomers.

Japanese patent 13,615 (Aug. 2, 1967; filed Feb. 15, 1963) relates to copolymers of butadiene and vinyl pyridine that were reduced to give waterproof, stable reduced copolymers. These products were useful for coating pills. The reduced copolymers were obtained by the catalytic hydrogenation in the presence of Raney nickel catalyst.

A paper titled "Oil-Resistant Rubbers from 2-Methyl Vinyl Pyridine," James E. Pritchard and Milton H. Opheim, *Industrial and Engineering Chemistry*, Volume 46, No. 10, pages 2242-2245, relates to quaternization of liquid polymers. Copolymers of butadiene and 2-methyl-5-vinyl pyridine (MVP) react with quaternizing agents to form polymeric salts of the type:

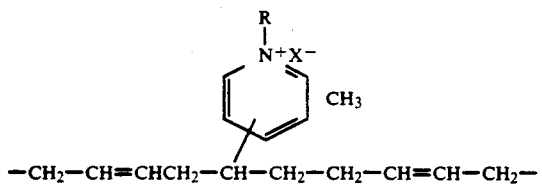

where R is an aliphatic or aromatic radical and X represents halide, alkyl sulfate, or aryl sulfonate groups.

SUMMARY OF THE INVENTION

Objects of the present invention include the formation of highly hydrogenated thermooxidatively stable liquid nonfunctional, monofunctional and difunctional-terminated conjugated diene copolymers of butadiene-alkenyl-pyridine and butadiene-acrylate utilizing conventional, relatively inexpensive homogeneous catalysts based on cobalt or nickel.

Another object of the present invention is to provide such highly hydrogenated thermooxidatively stable liquid conjugated diene copolymers of butadiene-alkenyl-pyridine and butadiene-acrylate which exhibit thermooxidative stability and compatibility for modifying materials such as plastics and rubbers.

These objects and advantages are obtained by the heat-resistant hydrogenated polymer of the present invention, comprising a heat-resistant hydrogenated polymer, comprising:

a random copolymer including first and second monomeric classes wherein the first monomeric class is a conjugated diene, branched conjugated diene, or mixture thereof containing from about 4 to about 8 carbon atoms, and the second monomeric class is polar and is a compound of the general formula

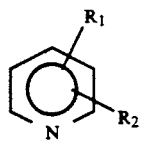

wherein $R_1$ is an alkenyl group containing from about 2 to about 8 carbon atoms and $R_2$ is hydrogen or an alkyl group containing from about 1 to about 8 carbon atoms, with the proviso that up to about 20 percent by weight of the second monomeric class can be replaced with the compound of the general formula $CH_2=CR_3CX$ wherein $R_3$ is hydrogen or a methyl group and X is $-OOR_4$, $-ONR_5R_6$, or $-OOR_7OR_4$ wherein $R_4$ is an alkyl group containing from about 1 to about 4 carbon atoms, $-CH_2CF_3$ or $-CH_2CF_2CF_2H$, $R_5$ and $R_6$ are alkyl groups independently containing from about 1 to about 4 carbon atoms, and $R_7$ is an alkylene group containing from about 1 to about 4 carbon atoms, wherein the weight ratio of the first monomer to the second monomer is from about 25 percent to about 85 percent to from about 75 percent to about 15 percent, wherein the weight average molecular weight of the random copolymer is from about 50 to about 20,000, and wherein the degree of hydrogenation of the random copolymer is greater than about 80 percent.

These objects and advantages are further obtained by the heat-resistant hydrogenated polymer of the present invention, comprising, a heat-resistant hydrogenated polymer, comprising:

a random copolymer including first and second monomeric classes wherein the first monomeric class is a conjugated diene, branched conjugated diene, or mixture thereof containing from about 4 to about 8 carbon atoms, and the second monomeric class is polar and is of the general formula $CH_2=CR_8CX$, wherein $R_8$ is hydrogen or an alkyl group containing from about 1 to about 4 carbon atoms and X is $-OOR_9$, $-ONR_{10}R_{11}$, or $-OOR_{12}OR_9$ wherein $R_9$ is an alkyl group containing from about 1 to about 4 carbon atoms, $-CH_2CF_3$, or $-CH_2CF_2CF_2H$, $R_{10}$ and $R_{11}$ are alkyl groups independently containing from about 1 to about 4 carbon atoms, and $R_{12}$ is an alkylene group containing from about 1 to about 4 carbon atoms, with the proviso that up to about 20 percent by weight of the second monomeric class can be replaced with the compound of the general formula

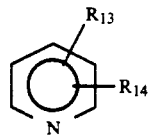

wherein $R_{13}$ is an alkenyl group containing from about 2 to about 8 carbon atoms and $R_{14}$ is hydrogen or an alkyl group containing from about 1 to about 8 carbon atoms, wherein the weight ratio of said first monomer to the second monomer is from about 25 percent to about 85 percent to from about 75 percent to about 15 percent, wherein the weight average molecular weight of the random copolymer is from about 50 to about 20,000, and wherein the degree of hydrogenation of the random copolymer is greater than about 80 percent.

These objects and advantages are still further obtained by the heat-resistant hydrogenated homopolymer of the present invention, comprising a heat-resistant hydrogenated homopolymer, comprising:

monomers of a conjugated diene, a branched conjugated diene, or a mixture thereof containing from about 4 to about 5 carbon atoms, the homopolymer having a functional group situated on at least one of its ends, wherein the weight average molecular weight of the homopolymer is from about 50 to about 20,000, and wherein the degree of hydrogenation of the homopolymer is greater than about 80 percent.

BRIEF DESCRIPTION OF THE DRAWINGS

FIG. 15 is a graph of the infrared spectrum of an ester-terminated liquid polybutadiene liquid homopolymer; and FIG. 16 is a graph of the infrared spectrum of the hydrogenated homopolymer of FIG. 15.

DESCRIPTION OF THE PREFERRED EMBODIMENTS

Figure 1:
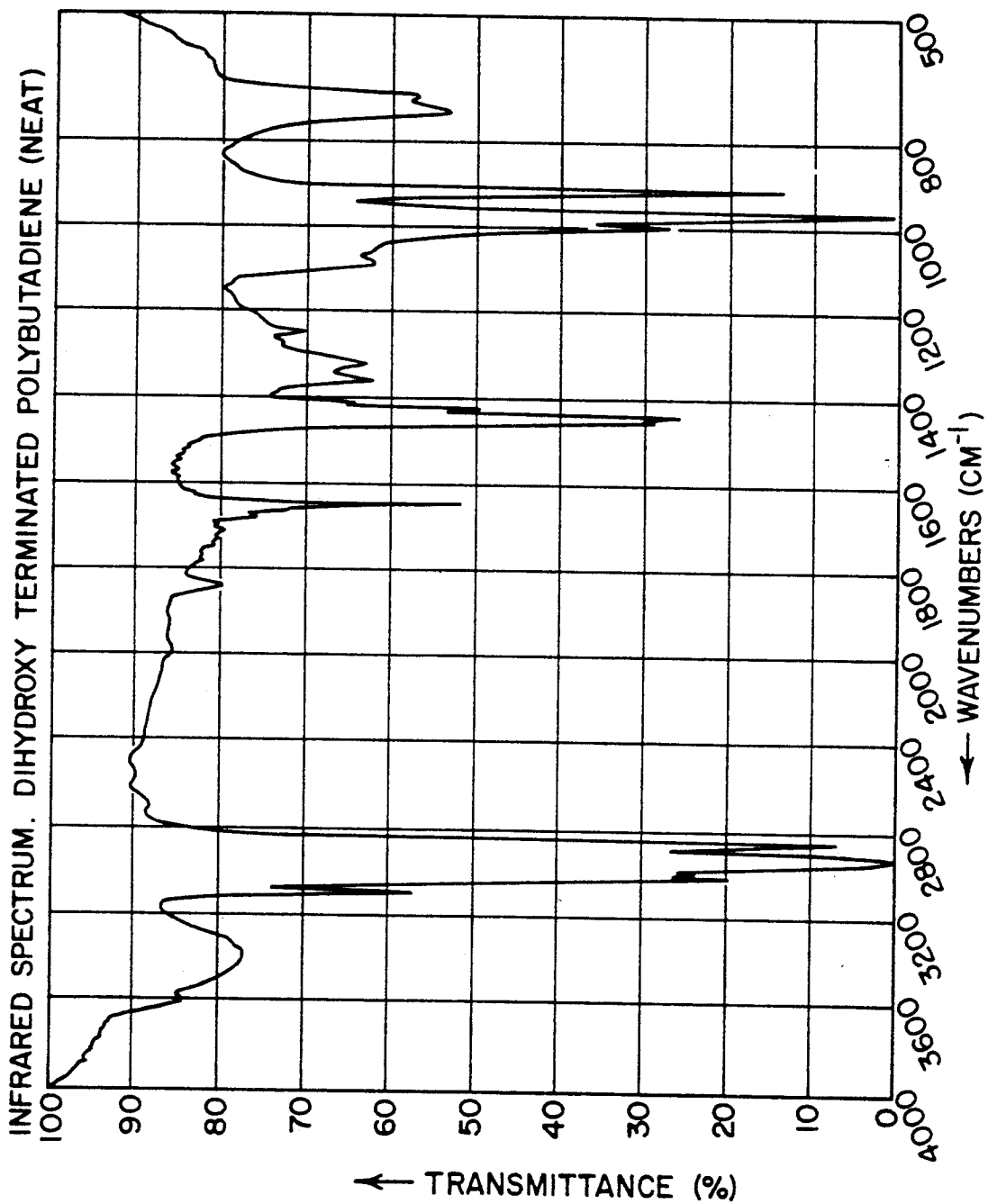
FIG. 1 is a graph of the infrared spectrum for a sample of liquid difunctional hydroxy-terminated polybutadiene starting material utilized in the present invention.

A first embodiment of the present invention is directed to the hydrogenation of liquid monofunctional and difunctional-terminated conjugated diene polymers to a high degree utilizing relatively inexpensive conventional homogeneous catalysts based on titanium, iron, cobalt, or nickel. This is accomplished by masking or blocking the functional end groups of the unsaturated conjugated diene polymer using a suitable masking group or blocking agent in order to prevent deactivation or "poisoning" of the hydrogenation catalyst by those groups, and then hydrogenating the backbone unsaturation in these polymers over the selected catalyst in a normal fashion. Subsequent hydrolysis of the blocked end groups returns the polymer to its original functionality.

The starting material monofunctional and difunctional-terminated conjugated diene polymers utilized in the first embodiment of the present invention are formed from conjugated diene monomers having 4 to 8 carbon atoms, with monomers having 4 or 5 carbon atoms being preferred, that is, butadiene and isoprene, respectively. The butadiene or isoprene polymers preferably are hydroxy-terminated, carboxyl-terminated, carboxamide-terminated, or imidazole-terminated.

The starting material difunctional-terminated conjugated diene polymers are prepared in the following manner. With regard to the difunctional hydroxy-terminated butadiene or isoprene polymers, formation is accomplished by preparing liquid polymerization products of butadiene or isoprene in a particular solvent which has a low chain transfer potential, namely tertiary butanol or acetone, and employing a peroxide initiator, with hydrogen peroxide being preferred and having the following structural formula:

$H_2O_2$

No dithio modifiers are required in the preparation of the difunctional-terminated conjugated diene polymers.

An important aspect in producing the difunctional-terminated polybutadienes and polyisoprenes is the selection of a solvent for the polymerization system that will have a very low chain transfer constant, as referred to above. The free radical-growing end of a vinyl polymer chain molecule bears an odd electron and is a center of high reactivity. It can add monomer molecules and attack the solvent, removing therefrom an atom such as hydrogen to satisfy the free valence. When this attack or chain transfer from the solvent occurs, the particular polymer chain end becomes hydrogen-terminated. Each monomer growing chain or macro radical has its own characteristic degree of chain transfer for each different solvent. For example, carbon tetrachloride, $CCl_4$, is a highly reactive transfer agent for styrene polymerization, but is inferior to ketones for vinyl chloride polymerization and has little effect on acrylic acid or acrylonitrile polymerization. The chain transfer potential of a given solvent for a given monomer system is not predictable. Thus, it was surprising to discover that tertiary butanol and acetone, among many alcoholic and non-alcoholic systems studied, each have an extremely low chain transfer potential for butadiene and isoprene monomer systems leading to the production of low molecular weight polybutadienes or polyisoprenes having functionality at each end of the polymer chain due to coupling of the growing polymer chains. More specifically, liquid polybutadienes and polyisoprenes having a molecular weight of from about 500 to about 20,000; desirably from about 2,000 to about 10,000; and preferably from about 3,000 to about 5,000, are produced when a catalyst such as peroxide or the like is employed as the polymerization initiator. It is important to note that initiators containing nitrile groups cannot be utilized in forming the difunctional-terminated polybutadiene or polyisoprene starting materials, since nitrile groups would be hydrogenated by the conventional homogeneous catalysts used in the present invention, resulting in undesirable cross-linking reactions between the polymer chains and giving an unsuitable product.

When butadiene or isoprene monomers are polymerized in tertiary-butanol or acetone in the presence of an initiator such as peroxide at 70° to 80° C., and the polymerization is allowed to run until the initiator is about 75 percent decomposed as determined from its half-life at the particular temperature, excess butadiene or isoprene can be vented and the liquid polymer thrown down with methanol. After settling, the methanol tertiary butanol or methanol-acetone layer can be decanted. Inasmuch as the liquid difunctional-terminated isoprene polymers are well known to those of ordinary skill in the art, and have structures similar to those of the difunctional-terminated butadiene polymers represented by the formulas set forth in detail below, the structure of the isoprene polymers will not be set forth herein.

The hydrogen peroxide initiator, H₂O₂, utilized in forming the difunctional hydroxy-terminated polybutadiene and polyisoprene materials useful as starting materials in the first embodiment of the present invention, decomposes to form the following free radicals:

HO· which initiate polymerization to form the difunctional hydroxy-terminated conjugated diene polymer. The action of this type of an initiator is due to the fact that the oxygen-oxygen bond is readily dissociated, as by thermal means. The above process leads to difunctional-terminated conjugated diene polymers with excellent reproducibility and which are free from contamination by emulsifiers and salts.

The liquid difunctional hydroxy-terminated butadiene polymer may be represented by the following structure:

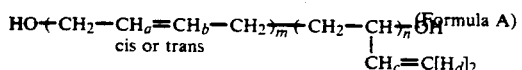

Hydroxy-Terminated Polybutadiene wherein n is from about 0 to about 90 weight percent, desirably from about 5 to about 15 percent, and preferably about 10 weight percent based on the total weight of m+n. Subscripts a, b, c, and d merely are identifiers for certain of the protons of the polymer, and will be useful in the examples set forth hereinbelow.

With regard to the difunctional carboxyl-terminated butadiene or isoprene polymers, formation is accomplished in a similar manner as described above for the difunctional hydroxy-terminated butadiene or isoprene polymers, except that an azo-bis acid initiator is employed, and preferably 2,2'-azobisisobutyric acid having the following structural formula:

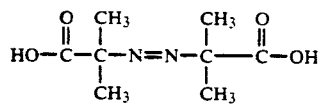

This initiator decomposes to form N₂ gas and the following free radicals:

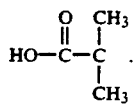

which initiate polymerization to form the difunctional carboxyl-terminated conjugated diene polymer. The action of this type of initiator is due to the fact that the tertiary carbon-nitrogen bond is readily dissociated, as by thermal means.

The liquid difunctional carboxyl-terminated butadiene polymer may be represented by the following structural formula:

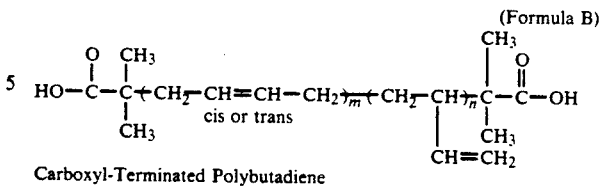

Carboxyl-Terminated Polybutadiene

With regard to the difunctional carboxamide-terminated butadiene or isoprene polymers, formation is accomplished in a manner similar to that described above for the difunctional hydroxy and carboxyl-terminated conjugated diene polymers, except that an azo-bis amide initiator is used, and preferably 2,2' azo-bis(isobutyramide) having the following structural formula:

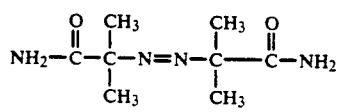

This initiator decomposes to form N₂ gas and the following free radicals:

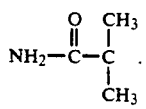

which initiate polymerization to form the difunctional carboxamide-terminated conjugated diene polymer. The action of this type of initiator is likely due to the fact that the tertiary carbon-nitrogen bond is readily dissociated, as by thermal means.

The liquid difunctional carboxamide-terminated butadiene polymer may be represented by the following structural formula:

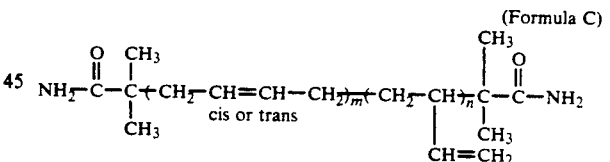

Carboxamide-Terminated Polybutadiene

With regard to the difunctional imidazole-terminated butadiene or isoprene polymers, again, formation is accomplished in a manner similar to that described above for the difunctional hydroxy, carboxyl and carboxamide-terminated conjugated diene polymers, except that an azo-bis imidazole initiator is employed, such as 2,2'-azobis-2-(imidazol-2-yl)propane having the following structural formula:

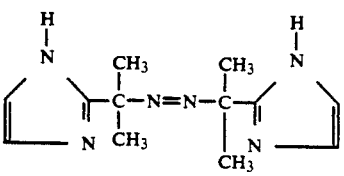

This initiator decomposes to form N₂ gas and the following free radicals:

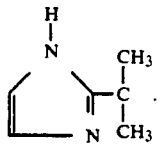

which initiate polymerization to form the difunctional imidazole-terminated conjugated diene polymer. The action of this type of initiator is also due to the fact that the tertiary carbon-nitrogen bond is readily dissociated, as by thermal means.

The liquid difunctional imidazole-terminated butadiene polymer may be represented by the following structural formula:

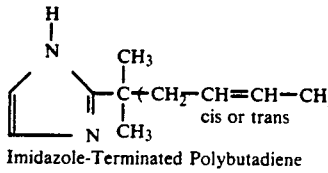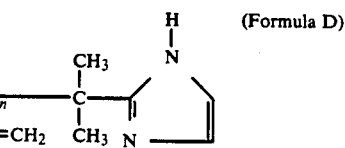 (Formula D)

Imidazole-Terminated Polybutadiene

It is to be noted that the above embodiments of the liquid difunctional-terminated conjugated diene starting material polymers are preferably produced by the solution polymerization method. It is understood that difunctional-terminated conjugated diene copolymers formed from a conjugated diene monomer such as butadiene or isoprene and another non-polar monomer such as styrene can be utilized to form the starting materials, without affecting the overall concept of the first embodiment of the present invention.

The alternative starting material, namely, statistical monofunctional-terminated conjugated diene polymers, are prepared in the following manner. It is to be understood that the term "statistical monofunctional" used for describing the alternative reactive liquid polymer starting material useful in the first embodiment of the present invention, means that the polymer is regarded, statistically, as having 100 percent monofunctional end groups. However, the statistical monofunctional polymer may include difunctional, nonfunctional and monofunctional species, or alternatively, only difunctional and non-functional species, as will be described in greater detail below.

The alternative low viscosity statistical monofunctional reactive liquid polymer starting materials useful in the first embodiment of the present invention are generally of two different types produced by two distinct processes. More particularly, the first type is a reaction product statistical monofunctional polymer composition, and the second type is a blended product statistical monofunctional polymer composition. With regard to the reaction product statistical monofunctional composition, the composition is the reaction product of various components such as a conjugated diene monomer and various initiators, and results in statistical monofunctional hydroxy, carboxyl, carboxamide, and imidazole-terminated reactive liquid polymers, depending, of course, on the initiator used. The resulting polymeric composition for each type of terminated polymer is actually a blend or a mixture of difunctional polymers, monofunctional polymers, and non-functional polymers, generally containing an average functionality per polymer of from about 0.2 to about 1.8, desirably from abut 0.7 to about 1.3, and preferably approximately 1, and hence is referred to as a statistical monofunctional polymer. Considering the monofunctional-terminated reactive liquid polymer, it contains either a terminal hydroxy, carboxyl, carboxamide, or imidazole group at one end of the polymer chain, and a non-reactive or nonfunctional group at the other end of the polymer chain. Each terminus is derived from a fragment of the initiators used in the synthesis employed to make the polymers. When the particular polymer is a difunctional-terminated polymer, it will contain either a terminal hydroxy, carboxyl, carboxamide, or imidazole group at both ends of the polymer chain. When the polymer is a nonfunctional polymer, it will contain nonfunctional groups on each end of the polymer chain.

The reaction product statistical monofunctional carboxyl-terminated reactive polymer starting material used in the first embodiment of the present invention is generally produced in the following manner.

The reaction product statistical monofunctional-terminated polymer can be generally indicated by the structural formula

T—PB—Y wherein T— is the terminal group derived from the difunctional initiator and preferably is a hydroxy, carboxyl, carboxamide, or imidazole group depending on the polymerization initiator used, —Y is derived from the nonfunctional initiator and —PB— represents the preferred butadiene or isoprene backbone of the polymer, with the backbone monomers being polymerizable by any free radical reaction to form a butadiene or isoprene homopolymer. Generally, the difunctional-terminated polymer is represented by the structural formula

T—PB—T

The statistical monofunctional-terminated polymers will contain generally a small or minority amount of such difunctional polymers, as well as nonfunctional polymers generally represented by the structural formula

Y—PB—Y wherein Y is derived from a nonfunctional initiator. The non-reactive terminus —Y of the molecule is referred to as such because it will not undergo condensation, as compared to the hydroxy, carboxyl, carboxamide, or imidazole termini, which will undergo that type of reaction. Although a solution polymerization process is preferred for forming the statistical monofunctional-terminated polymer starting material useful in the first embodiment of the present invention, an emulsion polymerization process could be used without affecting the overall concept of the invention.

It is important to note that initiators containing nitrile groups cannot be utilized in forming the monofunctional-terminated polybutadiene or polyisoprene starting materials, for the same reason as discussed above with regard to the difunctional-terminated polybutadiene or polyisoprene starting materials. It is understood that monofunctional-terminated conjugated diene copolymers formed from a conjugated diene monomer such as butadiene or isoprene and another non-polar monomer such as styrene can be utilized to form the starting materials, also without affecting the overall concept of the first embodiment of the present invention.

The blended product low viscosity statistical monofunctional reactive liquid polymer compositions useful as starting materials in the first embodiment of the present invention are generally the blended product of a statistical difunctional hydroxy, carboxyl, carboxamide, or imidazole-terminated reactive liquid polymer and a nonfunctional polymer. Such blending of the statistical difunctional terminated reactive liquid polymers with a nonfunctional polymer results in a statistical monofunctional hydroxy, carboxyl, carboxamide, or imidazole-terminated reactive liquid rubber polymer, respectively. Thus, the blended product low viscosity statistical monofunctional reactive liquid polymer includes a blend of a difunctional-terminated polymer which contains either a terminal hydroxy, carboxyl, carboxamide, or imidazole group at both ends of the polymer chain, and a nonfunctional polymer which contains nonfunctional groups on each end of the polymer chain.

More specifically, the reaction product statistical monofunctional-terminated polymers which are hydroxy, carboxyl, carboxamide, or imidazole-terminated, each can be made by the polymerization process as set forth briefly immediately below. The polymerization process utilizes any conventional addition polymerization technique employing a free radical mechanism. Generally, the reaction is conducted by mixing the preferred butadiene or isoprene backbone-forming monomer with a mixture of a difunctional and nonfunctional initiator, and a solvent, then heating.

The initiator is a mixture or blend of two different initiators capable of initiating a free radical polymerization, namely a difunctional initiator such as those described above for the formation of the difunctional-terminated conjugated diene polymers terminated with a hydroxy, carboxyl, carboxamide, or imidazole group, and a nitrile group-free nonfunctional initiator such as those that are well known in the art and to the literature.

The amount of initiators present, on a mole basis, may vary from about 0.2 percent to about 90 percent difunctional initiator and from about 10 percent to about 99.8 percent nonfunctional initiator. Preferably from about 30 percent to about 75 percent difunctional initiator is used and from about 70 percent to about 25 percent non-functional initiator. Most preferred is from about 60 percent to about 40 percent difunctional initiator and from about 40 percent to about 60 percent nonfunctional initiator. As noted, one skilled in the art will appreciate that the monofunctional polymer starting material is a blend or mixture of molecules having different end groups, namely a monofunctional species, a difunctional species and a non-functional species. When the ideal 50/50 blend of difunctional and nonfunctional initiators is used, it is expected that, statistically, one obtains by weight, from about 5 percent to about 90 percent difunctional specie, from about 90 percent to about 5 percent nonfunctional specie, and about 5 percent to about 50 percent monofunctional specie; desirably from about 10 percent to about 50 percent difunctional specie, from about 10 percent to about 50 percent nonfunctional specie, and up to about 50 percent monofunctional specie; and preferably about 25 percent difunctional specie, about 25 percent nonfunctional specie and about 50 percent monofunctional specie. When other ratios of difunctional and nonfunctional initiators are utilized, it will be appreciated that the end amount of the nonfunctional terminated polymer as well as the difunctional terminated polymer will generally vary in accordance with the ratio of the difunctional polymer to the nonfunctional polymer, but that the amount of the monofunctional specie will generally be no higher than 50 percent. However, as noted above, the blend or mixture of the respective statistical monofunctional-terminated polymers desirably each has an average functionality per polymer of approximately 1.

More particularly, the blended product low viscosity statistical monofunctional hydroxy, carboxyl, carboxamide, or imidazole-terminated polymers are respectively made by blending a difunctional hydroxy, carboxyl, carboxamide, or imidazole-terminated polymer with a nonfunctional polymer.

Difunctional hydroxy, carboxyl, carboxamide or imidazole-terminated reactive liquid polymers which are suitable for use in preparing, respectively, the blended product statistical monofunctional hydroxy, carboxyl, carboxamide, or imidazole-terminated reactive liquid polymers useful as starting materials in the first embodiment of the present invention, are prepared in accordance with the processes set forth above, which are hereby fully incorporated by reference.

The nonfunctional polymers which are blended with the various difunctional-terminated polymers described above to form the blended product statistical monofunctional polymers used as starting materials in the first embodiment of the present invention are well known to the art and to the literature.

The selected statistical difunctional and nonfunctional terminated polymers are brought together and blended in a simple stirrer or mixing device at a temperature of from about 40° C. to about 120° C., desirably from about 50° C. to about 90° C., and preferably from about 50° C. to about 60° C. The amount of difunctional and nonfunctional polymers present, on a mole basis, may vary from about 0.2 percent to about 90 percent difunctional polymer and from about 10 percent to about 99.8 percent nonfunctional polymer. Desirably from about 30 percent to about 75 percent difunctional polymer is used and from about 70 percent to about 25 percent nonfunctional polymer. Preferably from about 60 percent to about 40 percent difunctional polymer and from about 40 percent to about 60 percent nonfunctional polymer, and most preferably a blend of about 50 percent difunctional polymer and about 50 percent nonfunctional polymer is used. As noted, one skilled in the art will appreciate that the blended monofunctional polymer product is a mixture of molecules having different end groups, namely a difunctional species and a nonfunctional species. When the various amounts of difunctional and nonfunctional polymers are utilized in the mole amounts set forth above, it is expected that, statistically, one obtains an average functionality of from about 0.004 to about 1.8, desirably from about 0.6 to about 1.5, preferably from about 0.8 to about 1.2, and most preferably an average functionality of about 1.0. However, as noted above, the blended product statistical monofunctional terminated polymers each desirably have an average functionality of approximately 1.

The monofunctional-terminated polybutadienes and polyisoprenes produced by the two distinct processes described immediately above have a molecular weight of from about 500 to about 20,000; desirably from about 2,000 to about 10,000; and preferably from about 3,000 to about 5,000.

In accordance with one of the main features of the first embodiment of the present invention, the functional groups of the monofunctional or difunctional hydroxy, carboxyl, carboxamide, or imidazole-terminated conjugated diene polymers are blocked by suitable blocking agents in order to prevent deactivation or poisoning of the catalyst used in hydrogenation by those functional groups, thus allowing the hydrogenation of the backbone unsaturation in these polymers to proceed to a substantially high degree. For example, a difunctional hydroxy-terminated polybutadiene polymer is acetylated prior to hydrogenation to prevent the poisoning effect of the functional groups. More specifically, the polymer is reacted with acetic anhydride which blocks the functional hydroxy groups preventing these groups from poisoning the hydrogenation catalyst. After hydrogenating the polymer using hydrogen gas over a conventional homogeneous catalyst such as cobalt, the blocked hydrogenated polymer is subjected to hydrolysis which yields the hydrogenated difunctional hydroxy-terminated polybutadiene polymer. In general, the blocked end groups do not deactivate the catalyst because the blocking agents lack a heteroatomic hydrogen bond such as O—H or N—H as are found in the hydroxy, carboxyl, carboxamide, and imidazole end groups. These reactions can be represented as follows:

ing the other hydrogenated polymers. Specific differences between the manner of forming the various hydrogenated polymers of the present invention are set forth below, together with a more specific description of the respective processes. It is further understood that the type of conjugated diene monomer utilized in forming the backbone of the polymer, that is, preferably polybutadiene or polyisoprene, does not affect the manner in which the process of the first embodiment of the present invention is carried out.

Compounds suitable for use as blocking agents for the functional groups of the monofunctional and difunctional hydroxy-terminated conjugated diene polymers are acetic anhydride, a tetrahydropyranyl derivative, a methoxyethyl derivative, or a trimethylsilyl derivative, with acetic anhydride being preferred. Suitable blocking agent compounds for the functional groups of the monofunctional and difunctional carboxyl-terminated conjugated diene polymers include a tetrahydropyranyl derivative, a methoxyethyl derivative, a trimethylsilyl derivative, or an alkyl ester, with an alkyl ester or a trimethylsilyl ester being preferred. Compounds suitable for use as blocking agents for the functional groups of the monofunctional and difunctional carboxamide-terminated conjugated diene polymers are a N,N-dialkyl derivative or a bis-trimethylsilyl derivative, with a bis-trimethylsilyl derivative being preferred. Suitable blocking agents for the functional groups of the monofunctional and difunctional imidazole-terminated conjugated diene polymers include acetic anhydride, a tetrahydropyranyl derivative, a methoxyethyl derivative, or a trimethylsilyl derivative, with a trimethylsilyl derivative being preferred. These blocking agents generally

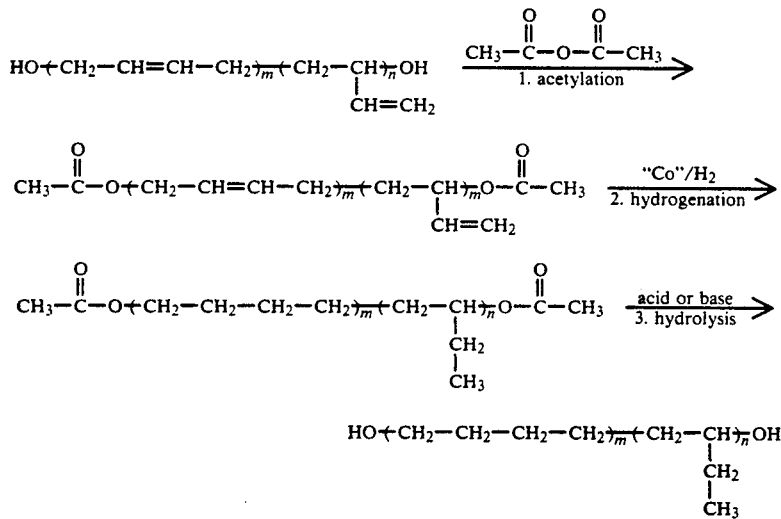

It is understood that the above-described process for producing the hydrogenated difunctional hydroxy-terminated polybutadiene polymer of the first embodiment of the present invention, is substantially similar to the process used in producing the hydrogenated difunctional carboxyl, carboxamide, and imidazole-terminated conjugated diene polymers, as well as to the process used in producing the hydrogenated monofunctional hydroxy, carboxyl, carboxamide, and imidazole-terminated conjugated diene polymers. The formation of the hydrogenated difunctional hydroxy-terminated polybutadiene polymer was utilized for illustration purposes as being representative of the processes for formare utilized in at least about an equivalent mole amount with respect to the functional groups being blocked, desirably in about a 3 to 1 equivalent mole ratio, and preferably in about a 10 to 1 equivalent mole ratio.

The conventional homogeneous hydrogenation catalysts, which can be utilized in the hydrogenation of any of the monofunctional or difunctional hydroxy, carboxyl, carboxamide, or imidazole-terminated conjugated diene polymers set forth above, are derived by the reduction of suitable salts of titanium, iron, cobalt, and nickel. Examples of suitable salts are titanocenedichloride and iron, cobalt and nickel acetylacetonates. Salts of cobalt or nickel that are soluble in organic solvents are preferred. An example of such a preferred salt is cobalt (II) neodecanoate, which is resistant to moisture absorption, and in which the molar ratio of cobalt to the preferred triethylaluminum reductant is about 1:4. Also, the organic groups attached to the metal have no acidic hydrogens. Thus, the common reducing agents, such as trialkylaluminum compounds, used in the formation of the active cobalt species are not consumed by side reactions. Dialkyl aluminum chlorides and organolithium or organomagnesium derivatives are other examples of suitable reducing agents for the transition metal salts. The resulting low or zero valent transition metal species may be stabilized by the addition of organic ligands such as hexamethylphosphoric triamide, tetramethylethylenediamine organic phosphines and phosphites, and the like. These conventional homogeneous hydrogenation catalysts are utilized in an amount of about 1 weight percent based on the weight of the polymer being hydrogenated.

Subsequent to hydrogenation, the hydrogenated monofunctional or difunctional-terminated conjugated diene polymer having blocked functional groups then is returned to its original functionality by reacting the polymer with a mineral acid such as hydrochloric acid (HCl) or a mineral base such as sodium hydroxide (NaOH) or potassium hydroxide (KOH). This step is a conventional hydrolysis step as is well known to those having ordinary skill in the art. An excess amount of the mineral acid or base sufficient to achieve hydrolysis is utilized.

The catalyst then can be removed from the monofunctional or difunctional-terminated conjugated diene polymer solution by isolating the polymer. More particularly, the polymer is precipitated from the organic solution by addition to a non-solvent containing one weight percent of a mineral acid such as hydrochloric acid (HCL) based on the total weight of the non-solvent. The catalyst may also be rendered insoluble by suitable additives, as is well known to the art and to the literature. Thus, the catalyst then can be removed by filtration of the solution containing the hydrogenated polymer. Examples of such additives are acetic acid, citric acid, sodium salts of dialkyldithiocarbamates, potassium cyanide, potassium iodide, and the like. These additives are used in an amount of about a molar equivalent amount to the catalyst metal, desirably in a molar ratio of about 5:1, and preferably in a molar ratio of about 10:1.

The hydrogenated monofunctional or difunctional hydroxy, carboxyl, carboxamide, or imidazole-terminated conjugated diene polymer of the present invention is prepared by the following process. Subsequent to formation of the selected starting material monofunctional or difunctional-terminated conjugated diene polymer, the functional end groups of the selected polymer are masked using a suitable one of the above-described blocking agents in a sufficient amount. The blocking step is carried out in an inert atmosphere at standard atmospheric pressure (1 atm), and at a temperature of from about 15° C. to about 150° C., desirably from about 20° C. to about 130° C., and preferably from about room temperature to about 110° C. Optionally, a catalyst base such as a tertiary amine or a Lewis base, or a catalyst acid such as a mineral acid can be utilized in a molar ratio amount of from about 2 to about 10 times that of the functional groups of the base polymer to aid in the blocking process.

The monofunctional or difunctional-terminated conjugated diene polymer having blocked functional groups then is subjected to hydrogenation over a selected conventional homogeneous catalyst in a sufficient amount as set forth above at a temperature of from about room temperature up to about 150° C., desirably from about 30° C. to about 70° C., and preferably at about 50° C., and at a pressure of from about 200 to about 1000 psi, desirably from about 400 to about 600 psi, and preferably at about 500 psi.

The hydrogenated monofunctional or difunctional-terminated conjugated diene polymer having blocked functional groups then is hydrolyzed using a selected one of the mineral acids or bases set forth above in an excess amount, in an inert atmosphere at standard atmospheric pressure (1 atm.), and at a temperature of from about 15° C. to about 150° C., desirably from about 20° C. to about 130° C., and preferably from about room temperature to about 110° C.

The catalyst and polymer subsequently are separated and the polymer isolated in a manner well known to those skilled in the art and described briefly above.

In accordance with a key aspect of the present invention, at least about 80 percent of the backbone unsaturation in the selected conjugated diene polymer is removed, desirably at least about 95 percent is saturated, and preferably at least about 99 percent of the backbone of the polymer is saturated for significantly improving the thermooxidative stability of the polymer. At least about 95 percent of the functional groups are returned to their former state by the hydrolysis step described above, and preferably at least about 99 percent.

The invention will be better understood by reference to the following examples. Inasmuch as the process for producing the hydrogenated monofunctional or difunctional conjugated diene polymer of the first embodiment of the present invention is similar regardless of whether the polymer backbone is formed from butadiene, isoprene, another diene, or a diene copolymer such as butadiene-styrene, or whether the polymer is monofunctional or difunctional, and further whether the polymer is hydroxy, carboxyl, carboxamide, or imidazole-terminated, the examples set forth below illustrate the process of the present invention for a difunctional hydroxy-terminated polybutadiene.

EXAMPLE 1

SYNTHESIS OF A DIFUNCTIONAL ACETOXY-TERMINATED POLYBUTADIENE

Under nitrogen, a sample of liquid difunctional hydroxy-terminated polybutadiene (40.0 g, 45HT available from Atochemicals, Inc.) was dissolved in 40 ml of acetic anhydride. The reaction solution was refluxed overnight. The excess acetic anhydride was then distilled off, with the last traces being removed by vacuum (80° C., 0.1 mm Hg, 4 hr.). The product was a colorless, viscous oil. The infrared spectrum of the product (FIG. 2), when compared with that of the starting material (FIG. 1), indicates the absence of the O—H stretching frequency (3700–3150 cm$^{-1}$) due to the terminal hydroxy groups, and the appearance of a carboxyl stretching frequency at 1740 cm$^{-1}$ due to the terminal acetyl groups. Thus the transformation from formula A to formula BLOCKED-A was accomplished as follows:

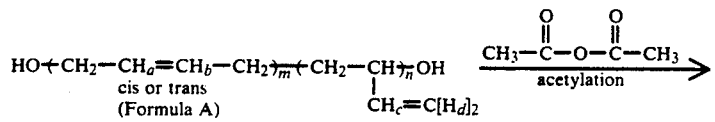

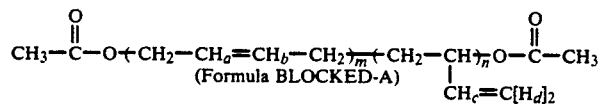

EXAMPLE 2
HYDROGENATION OF THE DIFUNCTIONAL ACETOXY-TERMINATED-POLYBUTADIENE

Under nitrogen, the difunctional acetoxy-terminated polybutadiene (40.0 g) of Example 1 was dissolved in 365 ml of dry cyclohexane (decanted from calcium hydride).

The hydrogenation catalyst was prepared under argon by the dropwise addition of triethylaluminum (27.0 ml, 1M in hexane; available from Aldrich) to a cooled (by ice), stirred (by magnetic bar) solution of cobalt neodecanoate (3.4 g, 12 wt. % Co metal in mineral spirits; available from Mooney). The addition of triethylaluminum caused the evolution of hydrocarbon gases and the purple cobalt solution turned brown immediately. Gas evolution ceased after the addition of approximately half of the triethylaluminum solution. After completion of the addition of triethylaluminum, the catalyst solution was allowed to stir under argon for 15 minutes at room temperature. The catalyst solution was then withdrawn via syringe and injected into the polymer solution prior to its transfer, under nitrogen, into an 845 ml autoclave.

The autoclave was pressurized with hydrogen (500 psi) and rocked at room temperature. The reactor was periodically repressurized to 500 psi in order to compensate for the hydrogen uptake by the polymer. In 1½ hours, a total pressure drop of 500 psi was observed. The temperature of the polymer solution was then raised to 50°-60° C. and the hydrogen pressure increased to 1000 psi. After a pressure drop of 35 psi 3 hr.), no more hydrogen uptake was observed. The autoclave was cooled, hydrogen pressure vented, and glacial acetic acid (100 ml) was added to the solution of the hydrogenated polymer under anaerobic conditions. The autoclave was rocked for 1 hour before the solution of the hydrogenated polymer was transferred to a sample bottle.

The hydrogenated acetylated polybutadiene compound was isolated as a white waxy solid by coagulation of the polymer solution in acidic methanol (containing 1 wt. percent of concentrated aqueous HCl). The solid was then dried (4 hr., 80° C., air; and 4 hr., 80° C., 0.1 mm Hg).

Analysis of the proton magnetic resonance (hereafter pmr) and infrared spectra of the product established the formation of a highly hydrogenated product as shown below in Formula HYDROGENATED BLOCKED-A:

(Formula HYDROGENATED BLOCKED-A)

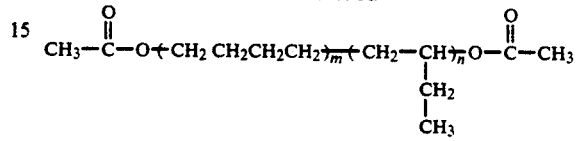

Figure 3:
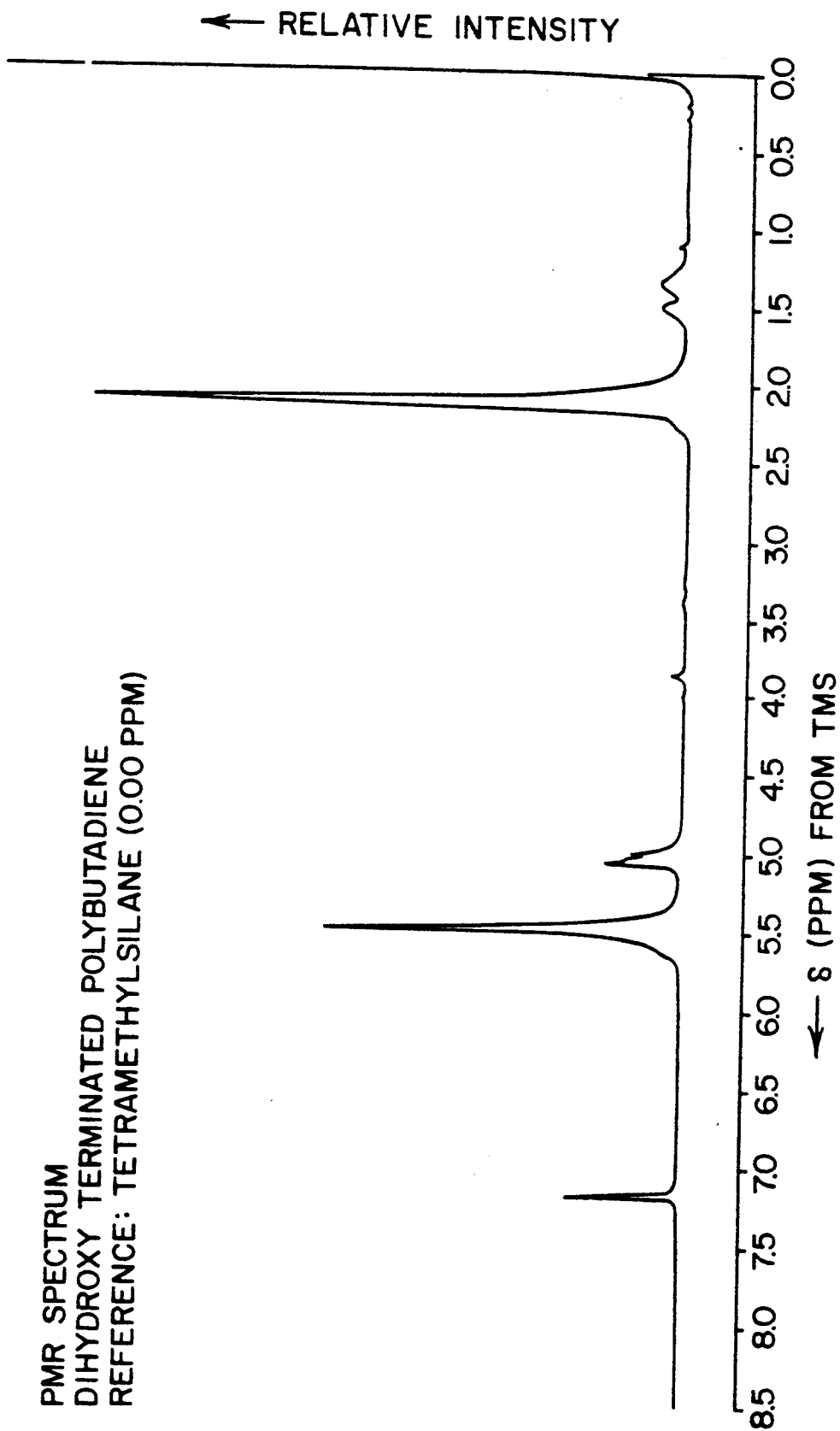
FIG. 3 is a graph of the proton magnetic resonance spectrum of the difunctional hydroxy-terminated butadiene polymer of FIG. 1.

Analysis of the pmr spectrum of the difunctional hydroxy-terminated polybutadiene of Formula A, that is:

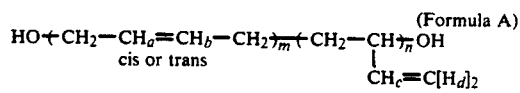

is described below in Table I and shown in FIG. 3.

TABLE I

| Absorption (ppm) | Assignment |
|---|---|
| 0.00 | Reference Signal |
| 1.10-2.36 | Aliphatic Protons |
| 3.85, 4.00 | From terminal —O—CH$_2$— and $-\overset{H}{\underset{|}{C}}-OH$ units of different polymer microstructures |
| 4.90-5.10 | Protons H$_d$ from the pendent vinyl groups resulting from butadiene polymerized in a 1,2 fashion. |
| 5.20-5.70 | Protons H$_a$, H$_b$ from butadiene polymerized in a 1,4 manner and proton H$_c$ from butadiene polymerized in a 1,2 manner. |
| 7.17 | Residual protons in benzene -d$_6$ (solvent) |

Analysis of the pmr spectrum of the hydrogenated acetylated polybutadiene compound of Formula HYDROGENATED BLOCKED-A, that is:

(Formula HYDROGENATED BLOCKED-A)

Figure 4:
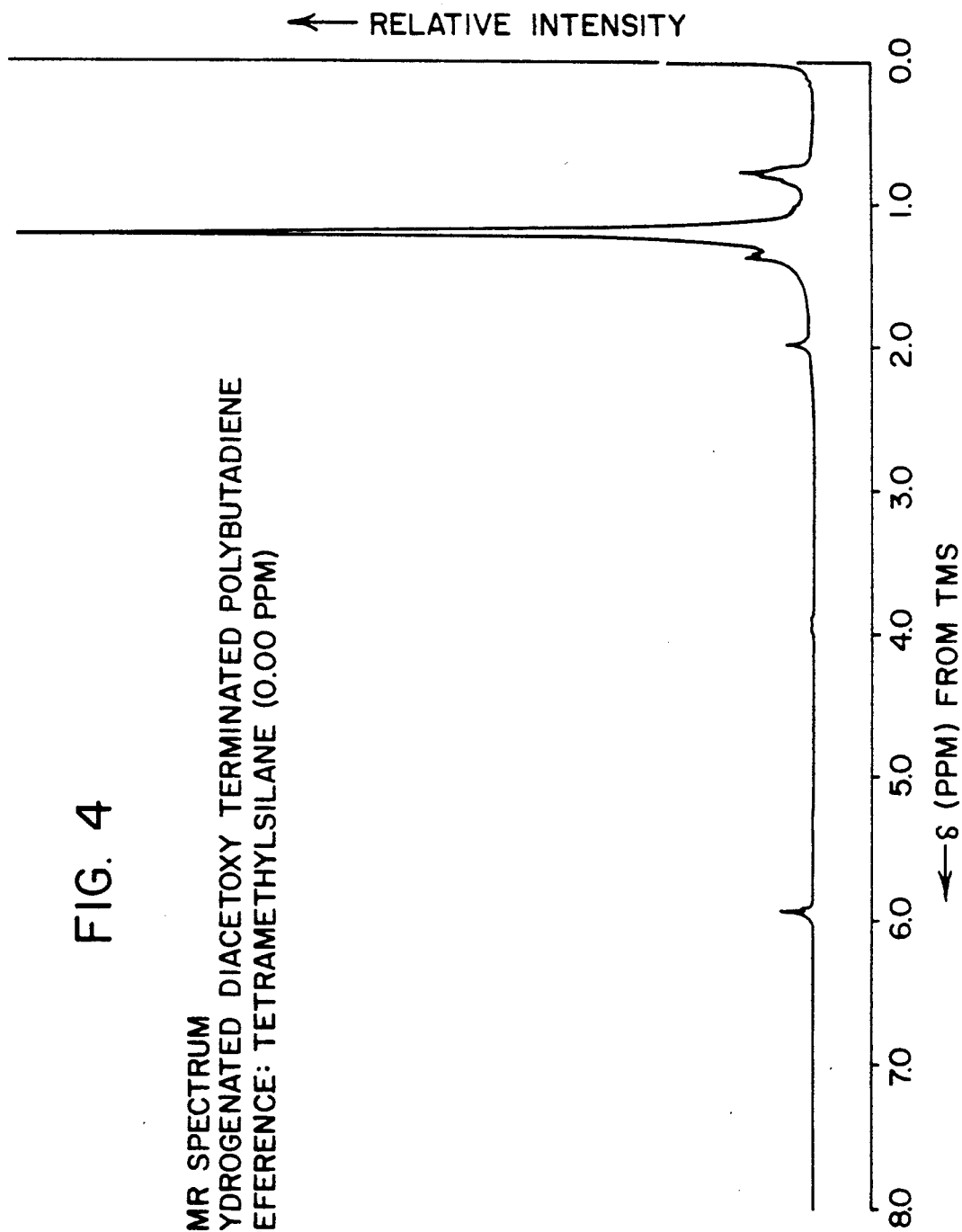
FIG. 4 is a graph of the proton magnetic resonance spectrum of the difunctional acetoxy-terminated butadiene polymer of FIG. 2 after hydrogenation.

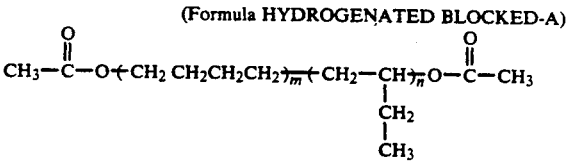

is set forth below in Table II and illustrated in FIG. 4.

TABLE II

| Absorption (ppm) | Assignment |
|---|---|
| 0.00 | Reference Signal |
| 0.60-0.90 | Methyl protons of pendent ethyl group |

TABLE II-continued

| Absorption (ppm) | Assignment |
| --- | --- |
| 0.90–1.80 | Aliphatic Protons |
| 1.98 | $CH_3-\underset{\underset{O}{\|\|}}{C}-$ protons of end groups |
| 3.90, 4.00 | $-O-CH_2-$ and $-CH-O-$ protons of different polymer microstructures |
| 5.35 (trace) | Residual Unsaturation |
| 5.93 | Residual protons in sym. tetrachloroethane $d_2$ (solvent) |

The almost complete absence of protons attached to carbon-carbon unsaturation (4.90–5.70 ppm) in the pmr spectrum of the hydrogenated polymer indicates near 100 percent hydrogenation.

Figure 5:
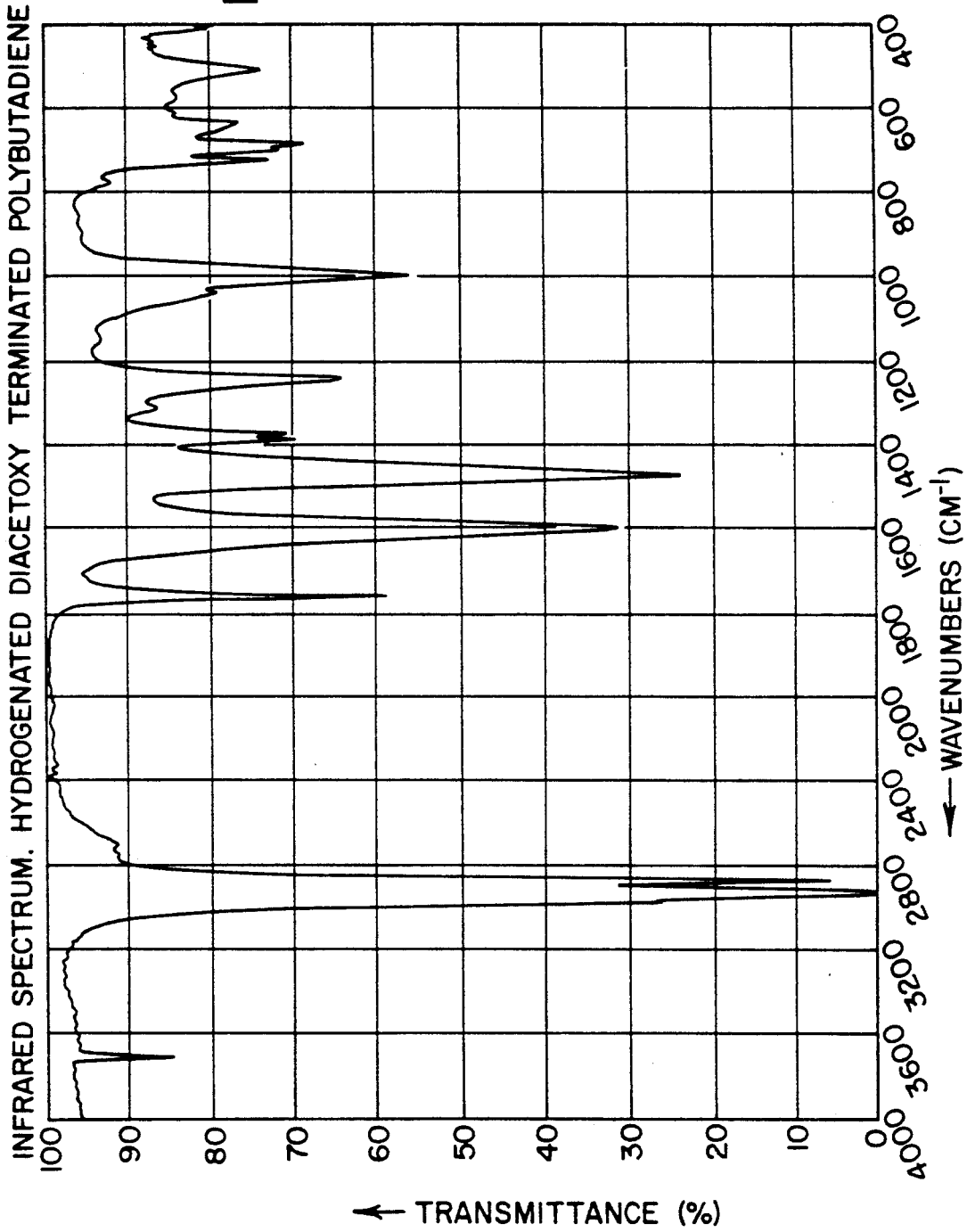
FIG. 5 is a graph of the infrared spectrum of the hydrogenated polymer of FIG. 4.

A comparison of the infrared spectra of the difunctional acetoxy-terminated butadiene polymer of Formula BLOCKED-A (FIG. 2) with that of the hydrogenated difunctional acetoxy-terminated butadiene polymer of Formula HYDROGENATED BLOCKED-A (FIG. 5) indicates the complete absence of the bands at 970 and 915 cm$^{-1}$ due to carbon-hydrogen bonds attached to carbon-carbon unsaturation.

EXAMPLE 3

HYDROLYSIS OF THE HYDROGENATED DIFUNCTIONAL ACETOXY-TERMINATED BUTADIENE POLYMER TO FORM THE HYDROGENATED DIFUNCTIONAL HYDROXY-TERMINATED BUTADIENE POLYMER

Under nitrogen, the product of Example 2 (2.0 g) was dissolved in cyclohexane (50 ml). Tricaprylmethylammonium chloride (0.2 g) and a solution of sodium hydroxide in methanol (0.5 g of commercial sodium hydroxide pellets were crushed and dissolved in 7.0 ml of methanol) were then added to the cyclohexane solution, which was refluxed for 5 hours.

The cooled reaction solution was extracted thrice with an equal volume of saturated aqueous ammonium chloride, dried (MgSO$_4$), and evaporated to a waxy solid which was dried (80° C., 0.1 mm Hg, 4 hr.). The formed product had the following structural Formula HYDROGENATED A:

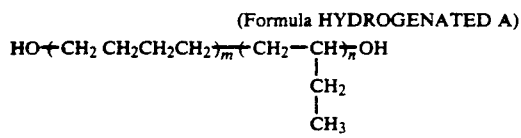

(Formula HYDROGENATED A)

Figure 2:
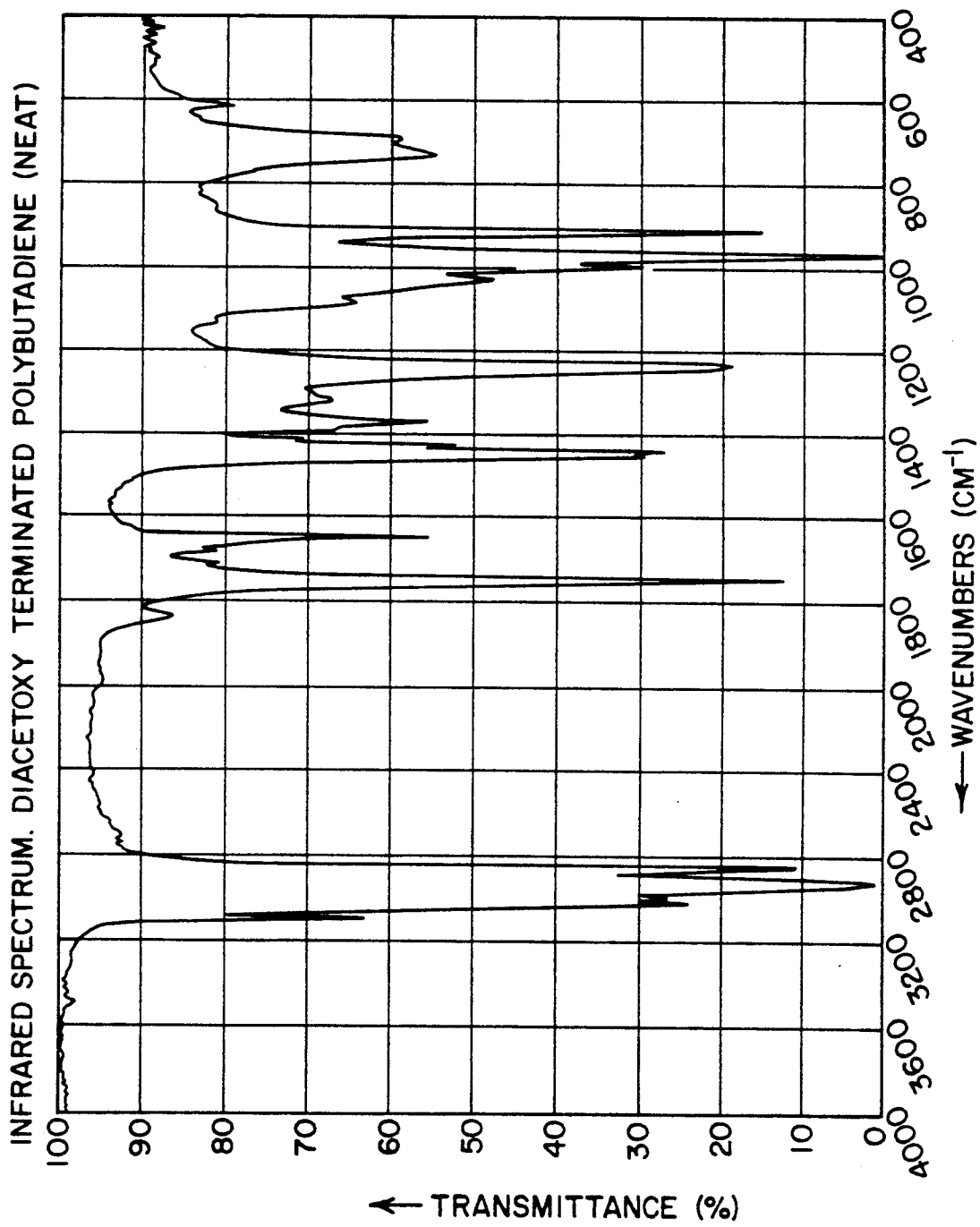
FIG. 2 is a graph of the infrared spectrum for a difunctional acetoxy-terminated butadiene polymer formed by acetylating the polymer of FIG. 1.
Figure 6:
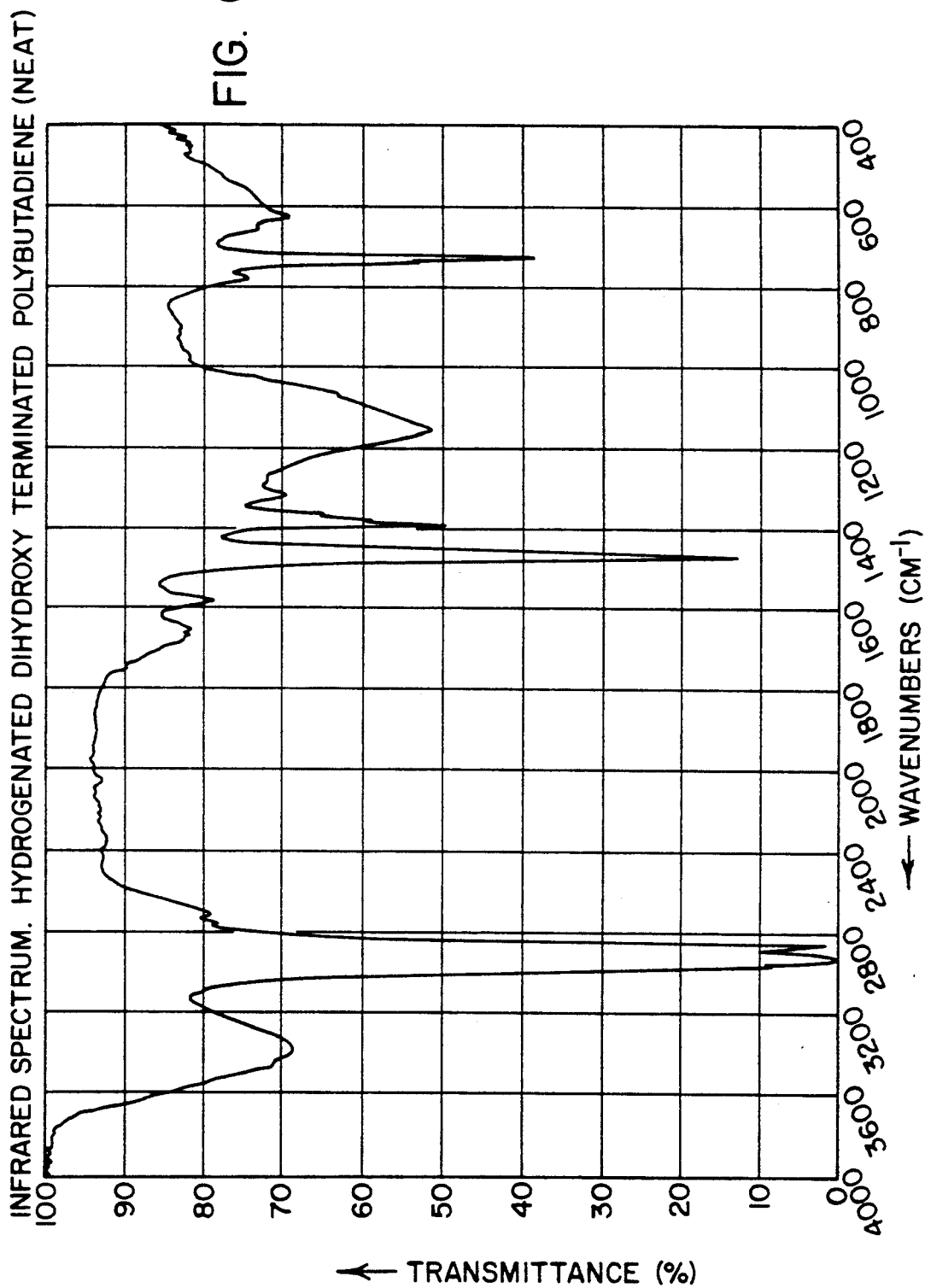
FIG. 6 is a graph of the infrared spectrum of the hydrogenated difunctional hydroxy-terminated polybutadiene product of the present invention formed by hydrolyzing the polymer of FIG. 4.

The infrared spectrum of the hydrogenated difunctional hydroxy-terminated butadiene polymer product of the present invention (FIG. 6) when compared with that of the hydrogenated difunctional acetoxy-terminated polybutadiene prior to hydrolysis and return of the polymer to its original functionality (FIG. 5) shows the absence of the terminal acetoxy groups (1740 cm$^{-1}$) and the appearance of terminal hydroxy groups (3700–3100 cm$^{-1}$) as in FIG. 1.

EXAMPLE 4

(COMPARATIVE EXAMPLE) ATTEMPTED HYDROGENATION OF LIQUID DIFUNCTIONAL HYDROXY-TERMINATED POLYBUTADIENE

Under nitrogen, a sample of liquid difunctional hydroxy-terminated polybutadiene (Formula A) (40.0 g, 45HT available from Atochemicals, Inc.) was dissolved in 365 ml of dry cyclohexane (decanted from calcium hydride).

A hydrogenation catalyst solution was made up as described in Example 2. Addition of the catalyst solution to the polymer solution caused instantaneous precipitation of the polymer due to chain extension and crosslinking reactions promoted by the aluminum and cobalt compounds of the catalyst, which were "poisoned" or deactivated by the —OH end groups of the polymer. Hence, hydrogenation of the polymer to a high degree could not be accomplished.

The liquid hydrogenated monofunctional and difunctional-terminated conjugated diene polymers of the first embodiment of the present invention are useful in the modification of epoxy resin systems to provide improved impact and water resistance to these systems due to the flexible backbone and the hydrocarbon character of the backbone of the conjugated diene monomers, respectively. The improved thermooxidative stability of the modifying polymers of the present invention also translates into superior heat resistance in the epoxy resin systems. The polymers of the present invention also can be used in the synthesis of heat and moisture-resistant polyurethanes and polyesters, which are then suitable in covulcanization with elastomers based on hydrocarbons such as EPDM to improve oil resistance and to improve adhesive properties in those polymers. Further, due to the hydrocarbon segments in the backbone monomers and their relatively non-polar nature, these polymers may be used as a compatibilizer in the blending of polar plastics or elastomers with relatively inexpensive non-polar materials. For example, a polyolefin/polyurethane blend modified with the polymers of the present invention may be suitable for the manufacture of paintable, scratch resistant, high quality surface finish structural parts for automobile and aerospace applications.

A second embodiment of the present invention relates to the hydrogenation of conjugated diene/alkenylpyridine and conjugated diene/acrylate liquid copolymers to a high degree utilizing conventional homogeneous catalysts based on cobalt, nickel, titanium, or iron. Such copolymers can be nonfunctional, monofunctional or difunctional. More particularly, the unsaturation derived from the conjugated diene portion of the copolymers is hydrogenated without effecting the unsaturation of the pendant polar pyridyl groups in the conjugated diene/alkyenylpyridine copolymer, or the pendant polar ester groups in the conjugated diene/acrylate copolymer, resulting in a copolymer which is heat resistant due to the saturation of the olefinic sites derived from the conjugated diene monomer and is compatible with materials being modified by the copolymers such as plastics and rubber due to the unaffected polar groups in the copolymer. The unhydrogenated starting copolymers of the present invention are formed in the following manner.

Conjugated dienes readily copolymerize with polar alpha, beta monomers in solution to give low molecular weight copolymers. The functionality of the copolymers, namely either nonfunctional, monofunctional, or difunctional, can be determined by the choice of initiator in the case of the nonfunctional and difunctional type copolymers, and by the choice of initiator or by blending the nonfunctional and difunctional type copolymers in the case of the monofunctional type copolymers, whereby the process for determining functionality was described in detail above for the first embodiment of the present invention and is hereby fully incorporated by reference with respect to the second embodiment. Subsequent hydrogenation of the backbone unsaturation in these polymers is a route to copolymers of conjugated diene with polar alpha, beta unsaturated monomers.

The first monomeric class of the copolymers utilized in the second embodiment of the present invention is a straight chain conjugated diene, a branched chain conjugated diene, or mixtures thereof. This diene contains from 4 to 8 carbon atoms. Examples of straight chain dienes are 1,3-butadiene, 1,3-pentadiene, 1,3-hexadiene, 1,4-hexadiene, 1,3-heptadiene, 2,4-heptadiene, 1,3-octadiene, 2,4-octadiene, and 3,5-octadiene. Some representative examples of branched chain dienes are isoprene, 2,3-dimethyl-1,3-butadiene, 2-methyl-1,3-hexadiene, 3-methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene. The preferred dienes for the practice of the second embodiment of this invention are butadiene and isoprene.

The second monomeric class of the conjugated diene copolymer of the second embodiment of the present invention is of the general formula:

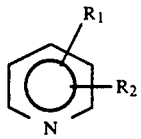

or of the general formula:

$$CH_2=CR_8CX \qquad (II)$$

Formula I represents an alkenylpyridine comonomer and Formula II represents an acrylate comonomer.

With regard to formula I, $R_1$ is an alkenyl group containing from 2 to 8 carbon atoms, preferably from 2 to 6, and most preferably from 2 to 4 carbon atoms. Particularly, $R_1$ is vinyl. $R_2$ is hydrogen or an alkyl group containing from 1 to 8 carbon atoms. When $R_2$ is an alkyl group, it preferably contains from 1 to 6 carbon atoms and most preferably from 1 to 4 carbon atoms. When $R_2$ is alkyl, a particular group is methyl.

Up to 20 percent by weight of the general formula (I) of the second monomeric class can be replaced with general formula IA:

$$CH_2=CR_3CX \qquad (IA)$$

$R_3$ is hydrogen or methyl and X is $-OOR_4$, $-ONR_5R_6$ or $-OOR_7OR_4$ wherein $R_4$ is an alkyl group containing from 1 to 4 carbon atoms, $-CH_2CF_3$ or $-CH_2CF_2CF_2H$, $R_5$ and $R_6$ are alkyl groups independently containing from 1 to 4 carbon atoms and $-OOR_7OR_4$ is an alkylene group containing from 1 to 4 carbon atoms. When $R_3$ is hydrogen or methyl and X is $-OOR_4$, some examples of general formula IA are acrylates, methacrylates, fluorinated acrylates or fluorinated methacrylates. When $R_3$ is hydrogen or methyl and X is $-ONR_5R_6$, general formula IA may be tertiary acrylamides or tertiary methacrylamides. When X is $-OOR_7OR_4$, preferably $R_7$ is an alkylene group containing from 1 to 2 carbon atoms and $R_4$ is an alkyl group containing from 1 to 2 carbon atoms. Preferably at least 3 percent of general formula (IA) is present in the second monomeric class and most preferably at least 7 percent of general formula (IA) is present in the second monomeric class.

As noted hereinabove, the second monomeric class can be of the general formula:

$$CH_2=CR_8CX \qquad (II)$$

wherein $R_8$ is hydrogen or an alkyl group containing from 1 to 4 carbon atoms and X is $-OOR_9$, $-ONR_{10}R_{11}$ or $-OOR_{12}OR_9$ wherein $R_9$ is an alkyl group containing from 1 to 4 carbon atoms, $-CH_2CF_3$, or $-CH_2CF_2CF_2H$, $R_{10}$ and $R_{11}$ are alkyl groups independently containing from 1 to 4 carbon atoms and $R_{12}$ is an alkylene group containing from 1 to 4 carbon atoms. Preferably $R_8$ is hydrogen or an alkyl group containing from 1 to 2 carbon atoms and most preferably $R_8$ is hydrogen or methyl. When X is $-OOR_9$, $R_9$ preferably is an alkyl group containing from 1 to 2 carbon atoms, and most preferably $R_9$ is methyl. When X is $-ONR_{10}R_{11}$, preferably $R_{10}$ and $R_{11}$ are alkyl groups independently containing from 1 to 2 carbon atoms and most preferably $R_{10}$ and $R_{11}$ are methyl. When X is $-OOR_{12}OR_9$ preferably $R_{12}$ is an alkylene group containing from 1 to 2 carbon atoms and $R_9$ is an alkyl group containing from 1 to 2 carbon atoms.

When $R_8$ is hydrogen or methyl and X is $-OOR_9$, some examples of general formula II are acrylates, methacrylates, fluorinated acrylates, or fluorinated methacrylates. When $R_8$ is hydrogen or methyl and X is $-ONR_{10}R_{11}$, general formula II may be tertiary acrylamides or tertiary methacrylamides. When $R_8$ is hydrogen or methyl and X is $-OOR_{12}OR_9$ general formula I may be alkoxyalkyl acrylates or methacrylates.

Up to 20 percent by weight of the general formula II of the second monomeric class can be replaced with general formula IIA:

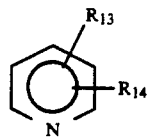

In general formula IIA, $R_{13}$ is an alkenyl group containing from 2 to 8 carbon atoms and $R_{14}$ is hydrogen or an alkyl group containing from 1 to 8 carbon atoms. Preferably $R_{13}$ is an alkenyl group containing from 2 to 6 carbon atoms, and most preferably from 2 to 4 carbon atoms. Particularly, $R_{13}$ is vinyl. When $R_{14}$ is an alkyl group, it preferably contains from 1 to 6 carbon atoms and most preferably from 1 to 4 carbon atoms. When $R_{14}$ is alkyl, a particular group is methyl. Preferably at least 3 percent of general formula IIA is present in the second monomeric class and most preferably at least 7 percent of general formula IIA is present in the second monomeric class. Again, conjugated 1,3-dienes copolymerize readily with alpha, beta unsaturated monomers including alkenylpyridine monomers or acrylate monomers. These liquid copolymers have polar groups. In addition, hydrogenation of the polymer backbone together with the pendant unsaturation derived from the hydrocarbon diene of the conjugated diene/alkenylpyridine and conjugated diene/acrylate copolymers is possible with inexpensive homogeneous catalysts based on iron, cobalt, nickel, or titanium by the process of the second embodiment of the present invention. Hence, high temperature compatible liquid copolymer compositions of the present invention can be obtained at a low cost.

The first step in the preparation of the liquid copolymer of the second embodiment of the present invention is in forming a random copolymer of the two monomeric classes. The random copolymer is formed by solution polymerization, a method which is well known to those having ordinary skill in the art. The weight ratio of the first monomeric class: the second monomeric class is from about 25-85:75-15, preferably 40-60:60-40, and most preferably 55-60:45-40. It is understood that although a solution polymerization method is preferred for forming the precursor liquid copolymers useful in the second embodiment of the present invention, other polymerization methods could be employed without affecting the overall concept of the present invention.

The liquid conjugated diene copolymer starting materials obtained for use in the second embodiment of the present invention generally have a weight average molecular weight of from about 50 to about 20,000; desirably from about 2,000 to about 10,000; and preferably from about 3,000 to about 5,000.

In accordance with one of the main features of the present invention, the above-described starting material low molecular weight liquid copolymers are hydrogenated. More particularly, the backbone unsaturation present in these nonfunctional, monofunctional or difunctional polymers conventional homogeneous hydrogenation catalysts can be utilized in the hydrogenation of any of the nonfunctional, monofunctional or difunctional liquid conjugated diene/alkenylpyridine or conjugated diene/acrylate liquid copolymers set forth above. These conventional homogeneous hydrogenation catalysts are derived by the reduction of suitable salts of titanium, iron, cobalt, and nickel. Examples of suitable salts are titanocene dichloride and iron, cobalt and nickel acetyl acetonates. Salts of cobalt of nickel that are soluble inorganic solvents are preferred. An example of such a preferred salt is cobalt (II) neodecanoate, which is resistant to moisture absorption, and in which the molar ratio of cobalt to the preferred triethylaluminum reductant is about 1:4. Also, the organic groups attached to the metal have no acidic hydrogens. Thus, the common reducing agents, such as trialkylaluminum compounds, used in the formation of the active cobalt species are not consumed by side reactions. Dialkyl aluminum chlorides and organolithium or organomagnesium derivatives are other examples of suitable reducing agents for the transition metal salts. The resulting lower zero valent transition metal species may be stabilized by the addition of organic ligands such as hexamethylphosphoric triamide, tetramethylethylene diamine organic phosphines and phosphates or phosphites and the like. These conventional homogeneous hydrogenation catalysts are utilized in an amount of about 1 weight percent based on the polymer being hydrogenated.

The catalyst then can be removed from the nonfunctional, monofunctional or difunctional-terminated conjugated diene/alkenylpyridine or conjugated diene/acrylate copolymer solution by isolating the copolymer. More particularly, the copolymer is precipitated from the organic solution by addition to a non-solvent containing one weight percent of a mineral acid such as hydrochloric acid (HCl) based on the total weight of the non-solvent. The catalyst may also be rendered insoluble by suitable additives, as is well known to the art and to the literature. Thus, the catalyst then can be removed by filtration of the solution containing the hydrogenated polymer. Examples of such additives are acetic acid, citric acid, sodium salts of dialkyldithiocarbamates, potassium cyanate, potassium iodide, and the like. These additives are used in an amount of about a molar equivalent amount to the catalyst metal, desirably in a molar ratio of about 5:1, and preferably in a molar ratio of about 10:1. The hydrogenated nonfunctional, monofunctional or difunctional-terminated conjugated diene/alkenylpyridine or conjugated diene/acrylate liquid copolymer of the present invention is prepared by the following process. Subsequent to formation of the selected starting material copolymer, it is subjected to hydrogenation of very selected conventional homogeneous catalysts in a sufficient amount as set forth above at a temperature of from about room temperature up to about 150° C., desirably from about 30° C. to about 70° C., and preferably at about 50° C., and at a pressure of from about 200 to about 1,000 psi, desirably from about 400 to about 600 psi, and preferably at about 500 psi.

The catalyst and copolymer subsequently are separated and the copolymer isolated in a manner well known to those skilled in the art and described briefly above. Although homogeneous catalysts based on titanium, iron, cobalt, or nickel are preferred in the practice of the present invention, it is understood that other catalysts such as specially prepared heterogeneous or homogeneous catalysts based on rhodium or palladium, or especially prepared heterogeneous catalysts based on cobalt, nickel, titanium or iron, can be used without affecting the overall concept of the present invention.

In accordance with a key aspect of the present invention, at least about 80 percent of the backbone unsaturation in the selected copolymer is removed, desirably at least about 95 percent is saturated, and preferably at least about 99 percent of the backbone of the copolymer is saturated for significantly improving the thermooxidative stability of the polymer.

It is further understood that certain liquid conjugated diene homopolymers can be hydrogenated using the method of the present invention without affecting the concept thereof.

The second embodiment of the present invention will be better understood by reference to the following examples.

EXAMPLE 1

SYNTHESIS OF A BUTADIENE/2-VINYLPYRIDINE LIQUID COPOLYMER

Dimethyl 2,2′-azobisisobutyrate (441 g, 0.972 lb., 0.00422 lb-mol; V-601 WACO Chemical, Richmond, Va.) was dissolved in 5.5 lbs. of acetone. The density of the solution was found to be 0.81 g/ml.

A 15 gallon reactor was "conditioned" with 5 gallons of acetone at 70° C. After removal of the wash acetone, the reactor was flushed with nitrogen. The addition of the following chemicals was assisted by evacuation of the reactor: V-601 solution (396 ml), acetone (12.4 lbs.), and 2-vinylpyridine (13.0 lbs., 0.124 lb.- mol). The reactor was then evacuated to 20–25" Hg (until the acetone just began to boil), followed by pressurization with nitrogen to 20 psi. This process was repeated before the addition of butadiene (15.5 lbs., 0.287 lb.- mol), assisted by vacuum (20" Hg). The initiator solution was metered into the reactor (after the contents of the reactor was heated to 90° C.) according to the following schedule:

| TIME (Hours) | INITIATOR SOLUTION (ml) |
| --- | --- |
| 1.0 | 276 |
| 2.0 | 401 |
| 3.0 | 359 |
| 4.0 | 359 |
| 5.0 | 324 |
| 6.0 | 324 |
| 7.0 | 305 |
| 8.0 | 305 |
| 9.0 | 289 |
| 10.0 | All remaining solution |

After 14 hrs, the solid content of the cement was 45 weight percent. The reactor was then cooled rapidly to 50° C., and unreacted butadiene vented off. The cement was "weathered" at 25° C. for 1 hr. at 15" Hg. Water (4 gallons) was added for coagulation, and the reaction mixture was agitated for 30 minutes. The water phase was removed after allowing the reaction mixture to settle for 4 hours.

A sample (400 g) of the liquid copolymer was dried (4 hours, 100° C., water aspirator; 4 hours, 100° C., 1 mm Hg) to yield a viscous oil.

The structure of the liquid butadiene/2-vinylpyridine copolymer is represented by formula 1:

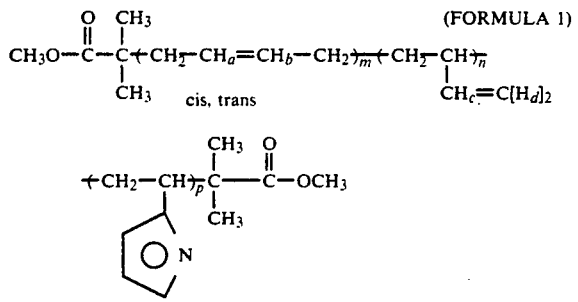

The end groups

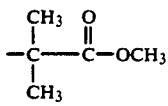

result from the initiator used.

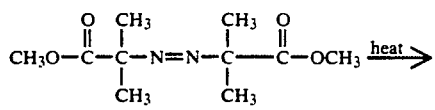

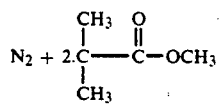

The free radicals

Figure 7:
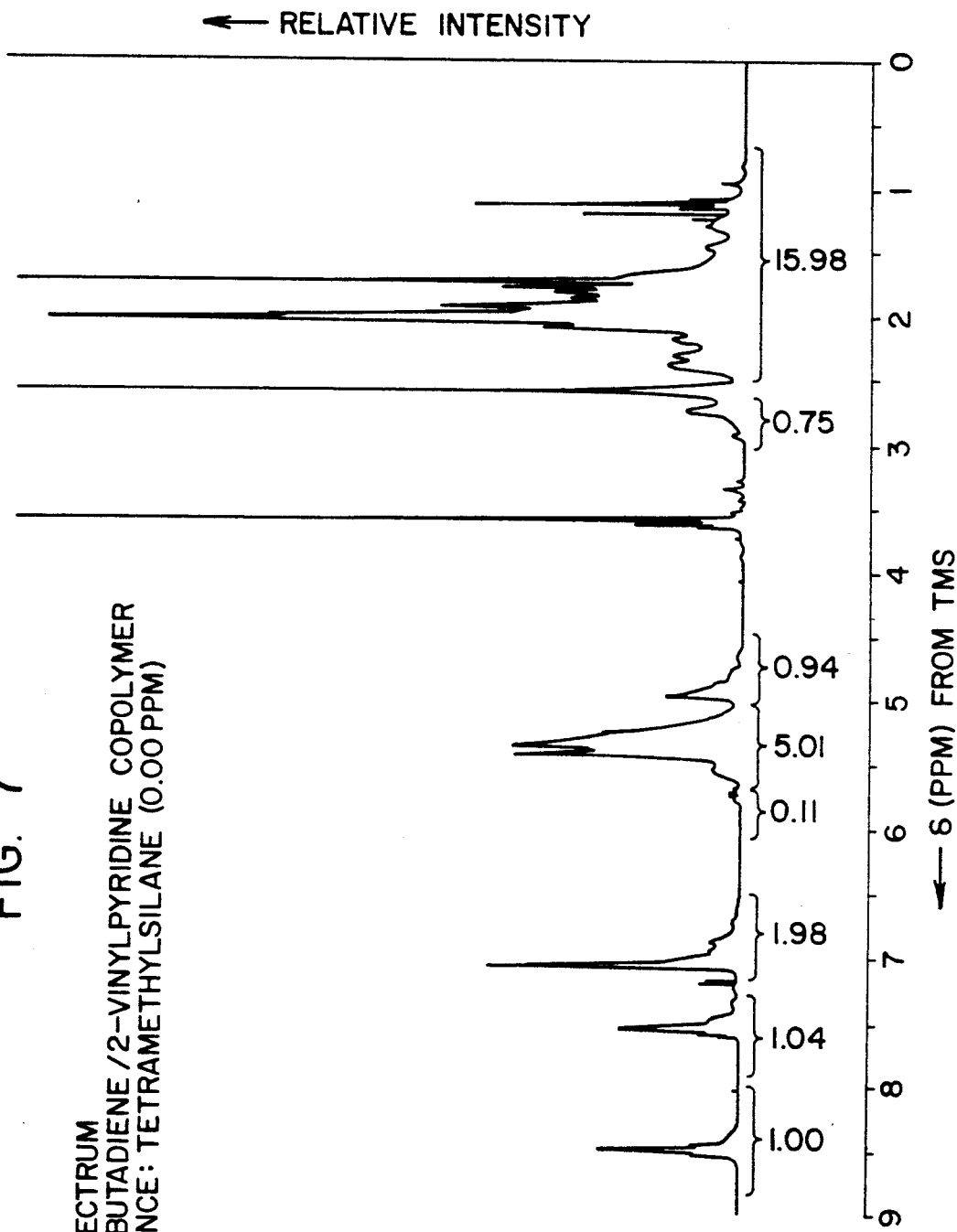
FIG. 7 is a proton magnetic resonance spectrum of a butadiene/2-vinylpyridine liquid copolymer of the type used in the second embodiment of the present invention.

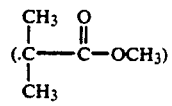

generated by the thermal decomposition of the initiator are incorporated as end groups at both ends in the copolymer as chain termination during polymerization occurring primarily by recombination of the growing polymer chains. Thus, the functionality of the polymer is expected to be between 1.8 to 1.9, that is, on an average, there are 1.8 to 1.9 groups from the initiator at the ends of every polymer chain (see H. E. Diem et al in "Rubber-Modified Thermoset Resins," C. K. Riew and J. K. Gillham Eds., Advances in Chemistry Series 208, American Chemical Society, Washington, D.C., 1984). Thus, the copolymer is not perfectly difunctional (as represented in formula 1), that is, every polymer chain does not have the $$\begin{array}{c} CH_3 \\ | \\ .C-CO_2CH_3 \\ | \\ CH_3 \end{array}$$

group at both ends as depicted. The proton magnetic resonance spectrum of the liquid copolymer is shown in FIG. 7.

| Graph 1 Interpretation | |
| --- | --- |
| ABSORPTION (ppm) | ASSIGNMENT |
| 0.95–2.95 | Aliphatic protons |
| 0.95–1.25 | 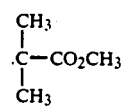 protons from end groups attached to different polymer microstructures |
| 1.7 | Residual protons in tetrahydrofuran-d$_8$, the solvent used for measurement of the spectrum |
| 2.6 | From residual acetone in the copolymer |
| 3.5–3.6 | From residual protons in tetrahydrofuran -d$_8$, the solvent used for measurement of the spectrum. Also, end group protons $\overset{O}{\underset{\|}{-C}}-OCH_3$ ($-C-OCH_3$) attached to different polymer microstructures |
| 4.55–5.0 | Geminal vinyl protons H$_d$ from butadiene copolymerized in a 1,2 fashion (formula 1) |
| 5.00–5.75 | Vinyl protons H$_a$, H$_b$ from butadiene copolymerized in |

| Graph I Interpretation | |
|---|---|
| ABSORPTION (ppm) | ASSIGNMENT |
| | a 1,4 manner and vinyl protons H$_c$ from butadiene copolymerized in a 1,2 manner (formula 1) |
| 6.60–8.57 | Aromatic protons from copolymerized 2-vinylpyridine |

The assignment of the signal from the end group protons, namely

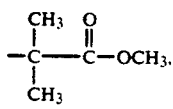

is based on the observed proton magnetic resonance spectrum of methyl trimethylacetate

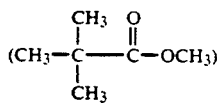

which is observed at 3.68 (OCH$_3$ group) and 1.2

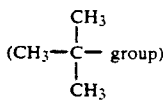

[see C. J. Pouchert, "The Aldrich Library of NMR Spectra," Edition II, vol. I, Aldrich Chemical Company, Milwaukee, Wis., 1983, p512B].

CALCULATION OF PERCENT OF BUTADIENE AND PERCENT OF 2-VINYLPYRIDINE IN COPOLYMER (FIG. 7)

The two geminal vinyl hydrogens H$_d$ (formula 1) observed at 4.55–5.00 in the pmr spectrum is represented by an area of 0.94. Therefore, one of those hydrogen atoms is represented by an area of 0.94/2 or 0.47. The absorption at 5.00–5.75 (includes protons H$_a$, H$_b$, and H$_c$) is represented by an area of 5.12. Since there is one H$_c$ for every 2H$_d$ hydrogens, the area due to H$_a$ and H$_b$ is 5.12−0.94/2 or 5.12−0.47=4.65 or 2.32 per hydrogen as H$_a$ and H$_b$ are present in equal numbers. Thus, the moles of copolymerized butadiene is represented by 2.32+0.47=2.79. Similarly, since there are 4 aromatic protons in the pyridine ring which appear at 6.60–8.60, the moles of 2-vinylpyridine copolymerized is represented by (1.00+1.04+1.98)/4=1.00. Hence, the mole percent of butadiene in the copolymer is $$\frac{2.79}{2.79 + 1.00} = 73.6 \text{ percent,}$$

and that of 2-vinylpyridine is 100−73.6=26.4 percent. Since the molecular weight of butadiene is 54 and that of 2-vinylpyridine is 105, the weight percent of butadiene in the copolymer is $$\frac{(2.79)54}{(2.79)54 + 105} = 58.9$$

percent, and that of 2-vinylpyridine is 100−58.9=41.1 percent.

The feed ratio of butadiene to 2-vinylpyridine for polymerization is 54.4 weight percent of butadiene and 45.6 weight percent of 2-vinylpyridine. Thus, the tendency of these monomers to copolymerize in a random fashion is confirmed [see S. Dasgupta and W. W. Thomas, Journal of Polymer Science: Polymer Chemistry Edition, 17, 923 (1979)].

From formula 1, and the absorptions of the vinyl and aromatic protons, the area expected in the aliphatic proton region can be calculated (0.95–2.95).

| UNIT | ALIPHATIC PROTON AREA EXPECTED |
|---|---|
| Butadiene copolymerized in a 1,2 fashion | 3 × area of 1 H$_d$ proton = 3 × 0.47 = 1.41 |
| Butadiene copolymerized in a 1,4-fashion | 4 × area of 1 H$_a$ proton = 4 × 2.32 = 9.28 |
| Copolymerized 2-vinylpyridine | 3 × area of 1 aromatic proton = 3 × 1 = 3 |

Total aliphatic proton area=1.41+9.28+3=13.69.
Observed area=16.73

The excess area in this region is due to residual acetone, residual protons in the tetrahydrofuran d$_8$ solvent, and the aliphatic contribution from the polymer end groups.

Figure 8:
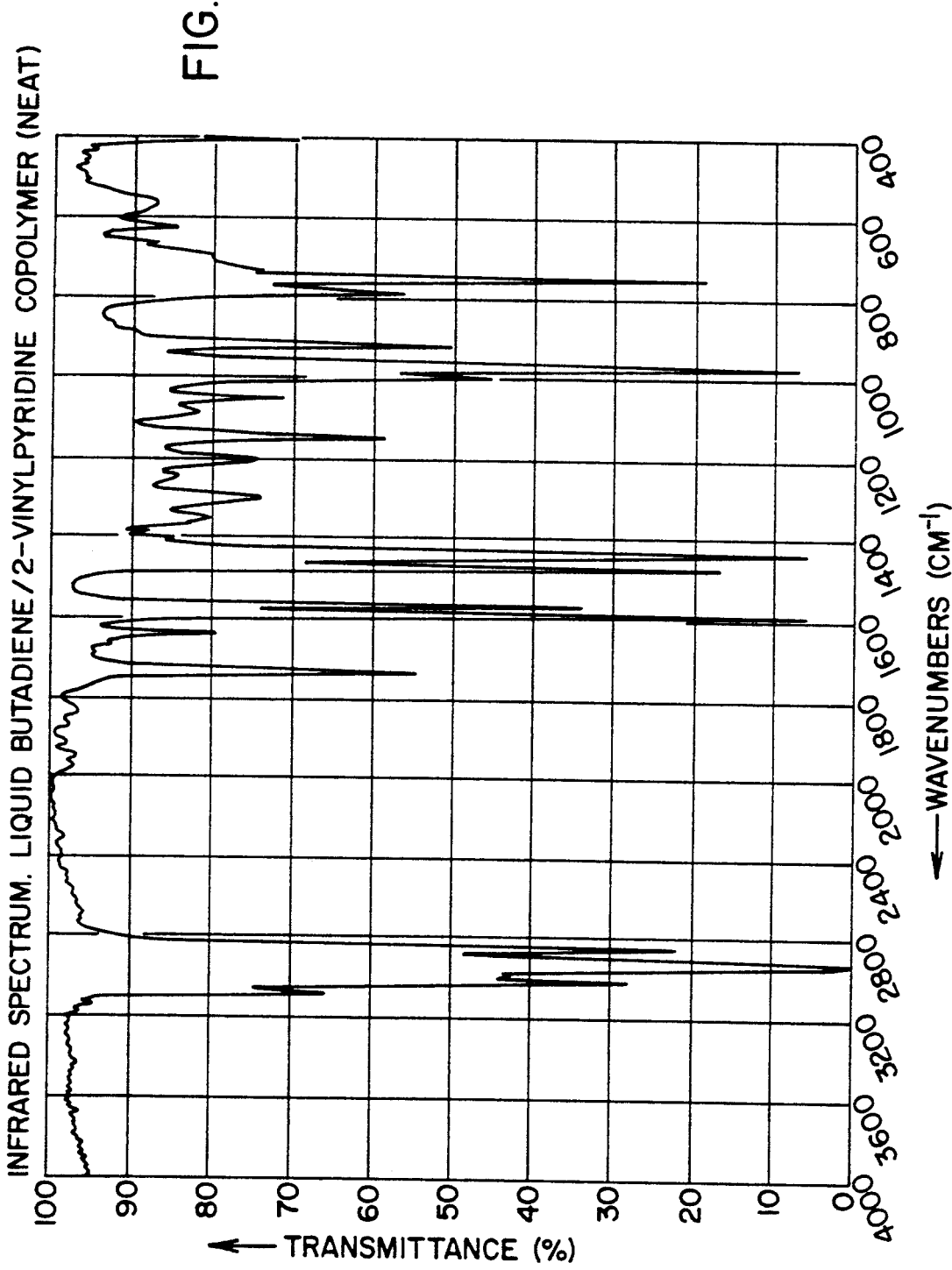
FIG. 8 is a graph of the infrared spectrum of the copolymer of FIG. 7.

The infrared spectrum of the liquid butadiene/2-vinylpyridine copolymer (FIG. 8) includes absorptions at 1735 cm$^{-1}$

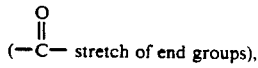

970 cm$^{-1}$ (out-of-plane olefinic C-H bend from butadiene copolymerized in a trans 1,4 fashion), and 915 cm$^{-1}$ (out-of-plane C-H bend from the vinyl group pendant to the polymer backbone from butadiene copolymerized in a 1,2-fashion [see D. Brueck, Kantschuk and Gummi Kunststoffe, 42 (2), 107 (1989)].

The absorption pattern between 1435–1590 cm$^{-1}$ is characteristic of the aromatic pyridine ring [C. J. Pouchert, The Aldrich Library of Infrared Spectra, Edition III, Aldrich Chemical Company, Milwaukee, Wis., 1981, p1306A.].

EXAMPLE 2

HYDROGENATION OF THE LIQUID BUTADIENE/2-VINYLPYRIDINE COPOLYMER FORMED IN EXAMPLE 1

Under nitrogen, a sample of the dried liquid butadiene/2-vinylpyridine copolymer (40.0 g) was dissolved in 385 ml of dry tetrahydrofuran (decanted from calcium hydride).

Figure 9:
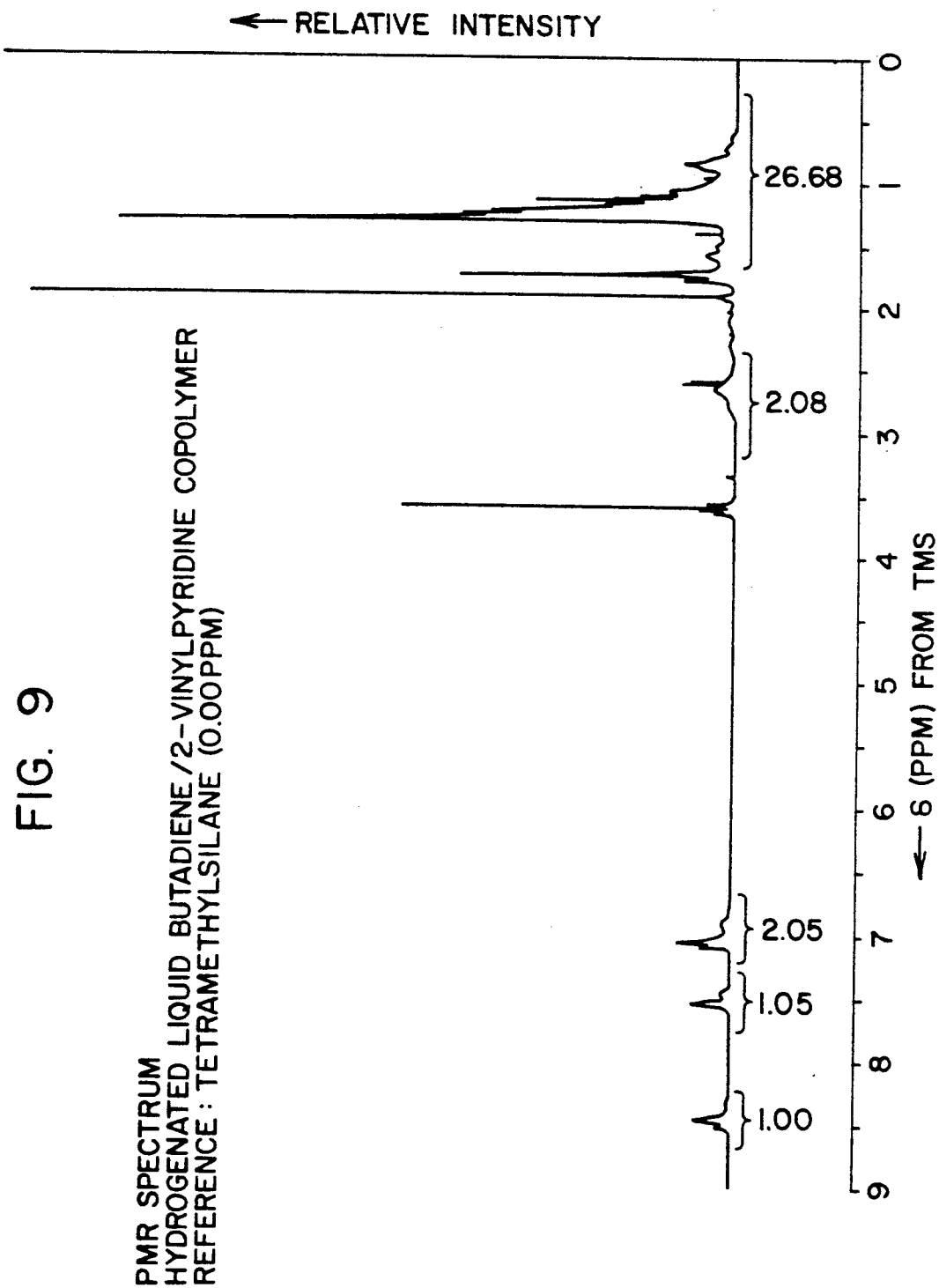
FIG. 9 is a graph of the proton magnetic resonance spectrum of a hydrogenated butadiene/2-vinylpyridine liquid copolymer.

The hydrogenation catalyst was prepared under argon by the dropwise addition of triethylaluminum (26.5 ml, 1M in hexane; Aldrich) to a cooled (ice), stirred (magnetic bar) solution of cobalt neodecanoate (3.3 g, 12 wt percent cobalt metal in mineral spirits; Mooney) and 7.0 ml of hexamethylphosphoramide (Aldrich). The addition of triethylaluminum caused the evolution of hydrocarbon gases, and the purple cobalt solution turned brown immediately. Gas evolution ceased after the addition of approximately half of the triethylaluminum solution. After completion of the addition of triethylaluminum, the catalyst solution was allowed to stir under argon for 15 minutes at room temperature. The catalyst solution was then withdrawn via syringe and injected into the polymer solution prior to its transfer, under nitrogen, to an autoclave (845 ml capacity). The autoclave was pressurized with hydrogen (500 psi) and rocked at room temperature. The reactor was periodically repressurized to 500 psi in order to compensate for the hydrogen uptake by the polymer. In 3 hours, a total pressure drop of 360 psi was observed. The temperature of the polymer solution was then raised to 50°-60° C. and the hydrogen pressure increased to 1000 psi. After a pressure drop of 80 psi (ca 3 hr.), no additional hydrogen uptake was observed. The autoclave was cooled, hydrogen pressure vented, and glacial acetic acid (55 ml) was added to the solution of the hydrogenated polymer under anaerobic conditions. The autoclave was rocked for 1 hour before the solution of the hydrogenated polymer was transferred to a sample bottle. The purple polymer solution was then precipitated in water and extracted with ether. The ether extract was dried over magnesium sulfate, filtered, and evaporated to a tan colored oil which was dried to a gooey solid (0.1 mm Hg, 80° C., 2 hr). FIG. 9 shows the proton magnetic resonance spectrum of a hydrogenated butadiene/2-vinylpyridine copolymer.

A butadiene/2-vinylpyridine copolymer, with a completely saturated polymer backbone, would be represented by formula 2.

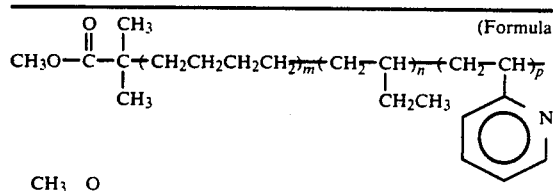

| ABSORPTION (ppm) | ASSIGNMENT |
|---|---|
| 0.60-2.73 | Aliphatic protons including protons from end groups |
| |  |
| 1.73 | Protons from residual tetrahydrofuran in polymer. Residual protons in tetrahydrofuran-d₈ used as pmr solvent |
| 1.9 | Unknown |
| 3.6 | Protons from residual tetrahydrofuran in polymer. Residual protons in tetrahydrofuran-d₈ used as pmr solvent. Protons from polymer end groups |
| | 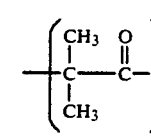 |

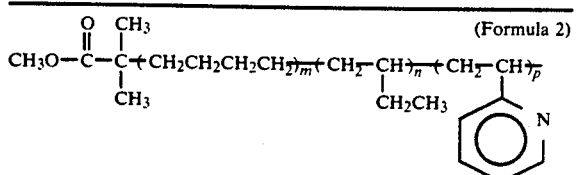

| ABSORPTION (ppm) | ASSIGNMENT |
|---|---|
| 6.75-8.55 | Aromatic protons of the pyridine ring |

The lack of absorption in the 4.55-5.75 region indicates the absence of protons attached to carbon-carbon unsaturation, and hence the absence of such unsaturation. Both backbone ("m" unit in formula 2) and pendant vinyl unsaturation ("n" unit in formula 2) in the copolymer have been completely saturated.

The four aromatic protons of the pyridine ring are represented by a total area of (1+1.05+2.05) or 4.1, a single proton being represented by 4.1/4 or 1.02. From the data given in Example 1 it was deduced that the mole ratio of butadiene to vinylpyridine in the copolymer was 73.6/26.4. Since the hydrogenated butadiene segment would contribute 8 aliphatic protons, the expected aliphatic proton area for the copolymer would be $$8 \times 1.02 \times \frac{73.6}{26.4} = 22.75$$

This is close to the observed aliphatic proton area of 28.76. The excess absorption is due to the signals from tetrahydrofuran and the end groups of the polymer.

In all probability, the pendant pyridine ring is not hydrogenated. Should part of the polymer contain a hydrogenated pyridine (that is, a piperidine ring), it would be represented by formula 3:

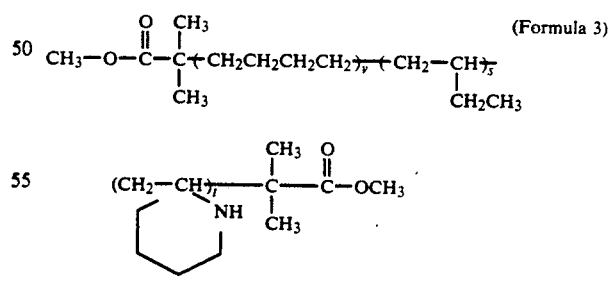

The aliphatic protons from the saturated pyridine (piperidine) ring would then contribute to the area in the aliphatic region of the spectrum (0.60-2.73). In order to investigate this possibility, the proton magnetic resonance spectrum of 2-ethylpiperidine was used as a model [see C. J. Pouchert, "The Aldrich Library of NMR Spectra," Edition II, vol. I, Aldrich Chemical Company, Milwaukee, Wis., p317A.]

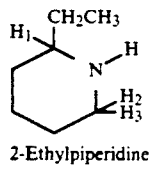

(Formula 4)

2-Ethylpiperidine

In the model compound of Formula 4, hydrogen atoms $H_1$, $H_2$ and $H_3$ appear as a complex multiplet between 2.1–3.3 ppm, while the remaining hydrogen atoms (except N-H) appear between 0.5–2.1 ppm. Since the characteristic absorption pattern of this compound cannot be seen, it is concluded that the pyridine ring in the copolymer is unhydrogenated. Thus, the polar character of the polymer is unchanged by hydrogenation.

CALCULATION OF THE MOLE PERCENT OF COPOLYMERIZED 2-VINYLPYRIDINE IN THE HYDROGENATED COPOLYMER:

Area represented by the moles of 2-vinylpyridine
copolymerized = (aromatic proton area)/4
= 1.02

Aliphatic contribution from copolymerized 2-vinylpyridine = $3 \times 1.02 = 3.06$ (see formula 2). Therefore, the aliphatic contribution from copolymerized butadiene is $28.76 - 3.06 = 25.70$. The moles of butadiene are then represented by $25.70/8 = 3.21$.

$$\text{Mole precent of copolymerized 2-vinylpyridine} = \frac{1.02}{1.02 + 3.21} = 24.1.$$

which compares well with the 26.4 mole percent of copolymerized 2-vinylpyridine in the starting material. This confirms further that the aromatic groups are unaffected by the hydrogenation process.

The infrared spectrum (FIG. 10) of the hydrogenated copolymer is devoid of the bands at 970 and 915 cm$^{-1}$ which are present in the spectrum of the starting material due to the hydrogen atoms attached to carbon-carbon unsaturation. Thus, the results from the proton magnetic resonance spectrum is further substantiated by the infrared spectrum.

Also, the ester carbonyl absorption at 1735 cm$^{-1}$ due to the polymer end groups, and the characteristic absorption of the pyridine ring between 1435–1590 cm$^{-1}$ remain unchanged in the spectrum of the hydrogenated copolymer when compared with the starting material. Should part of the pyridine groups be hydrogenated to piperidine rings as depicted in formula 3, then an N-H stretching band should be observed at 3300 cm$^{-1}$ in the infrared spectrum. For example, the N-H stretching band in the model compound 2-ethylpiperidine (formula 4) occurs at 3300 cm$^{-1}$ [see C. J. Pouchert, The Aldrich Library of Infrared Spectra, Edition III, Aldrich Chemical Company, Milwaukee, Wis., 1981, p.212F]. This is not the case for the hydrogenated copolymer which is devoid of absorption in the 3300 cm$^{-1}$ region. Hence, the pyridine rings in the copolymer are unaffected by the hydrogenation process.

EXAMPLE 3
SYNTHESIS OF A LIQUID BUTADIENE/METHYL ACRYLATE COPOLYMER

Using a procedure similar to that of Example 1, the liquid butadiene-methyl acrylate copolymer was made from 0.972 lb. of V-601, 15.5 lb. of butadiene and 15.5 lb. of methyl acrylate. The solids content of the final cement was 45.9 wt. percent. The copolymer was isolated as a colorless oil. The structure of this product is represented by formula 5:

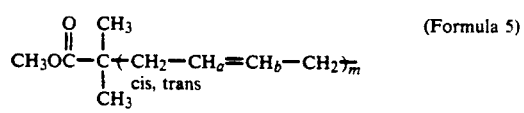

(Formula 5)

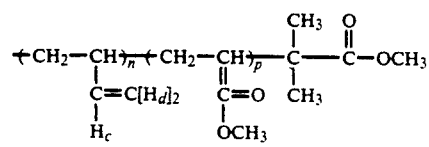

Figure 11:
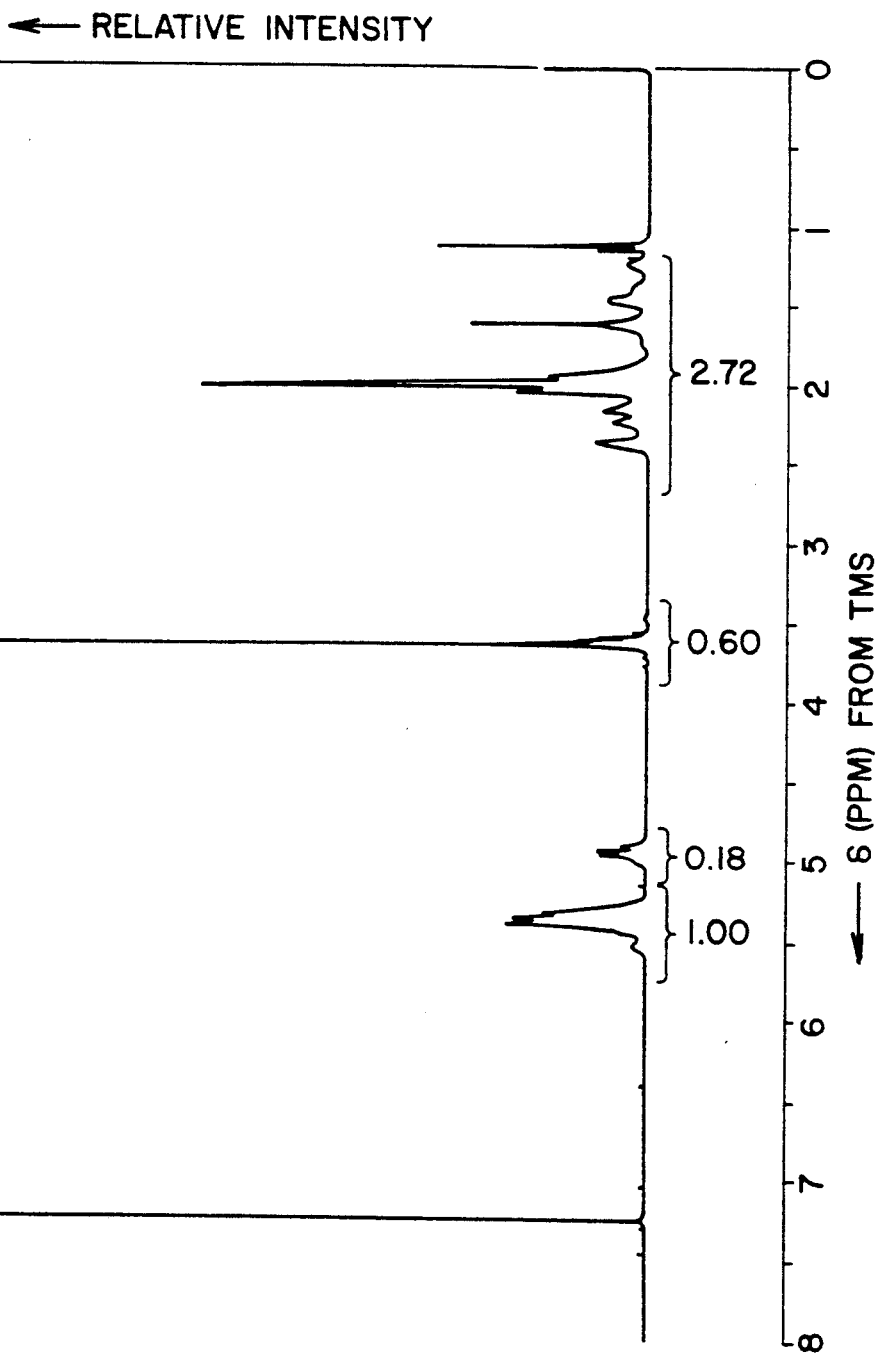
FIG. 11 is a graph of the proton magnetic resonance spectrum of a butadiene/methyl acrylate liquid copolymer.

The proton magnetic resonance spectrum of this copolymer is shown in FIG. 11.

| ABSORPTION | ASSIGNMENT |
| --- | --- |
| 0.00 | Reference signal |
| 1.10–2.46 | Aliphatic protons |
| 1.10–1.20 | Aliphatic protons from end groups |
| | $\begin{array}{c} CH_3 \ O \\ | \ \| \\ (-C-C-) \\ | \\ CH_3 \end{array}$ connected to different polymer microstructures |
| 3.55–3.70 | Aliphatic protons |
| | $(-\overset{O}{\overset{\|}{C}}-OCH_3)$ from copolymerized methylacrylate and polymer end groups |
| 4.80–5.00 | Olefinic protons $H_d$ from butadiene copolymerized in a 1,2 fashion |
| 5.20–5.60 | Olefinic protons $H_a$, $H_b$ from butadiene copolymerized in a 1,4 fashion and olefinic proton $H_c$ from butadiene copolymerized in a 1,2 fashion |
| 7.25 | Chloroform impurity in chloroform-d solvent used to record spectrum |

Figure 10:
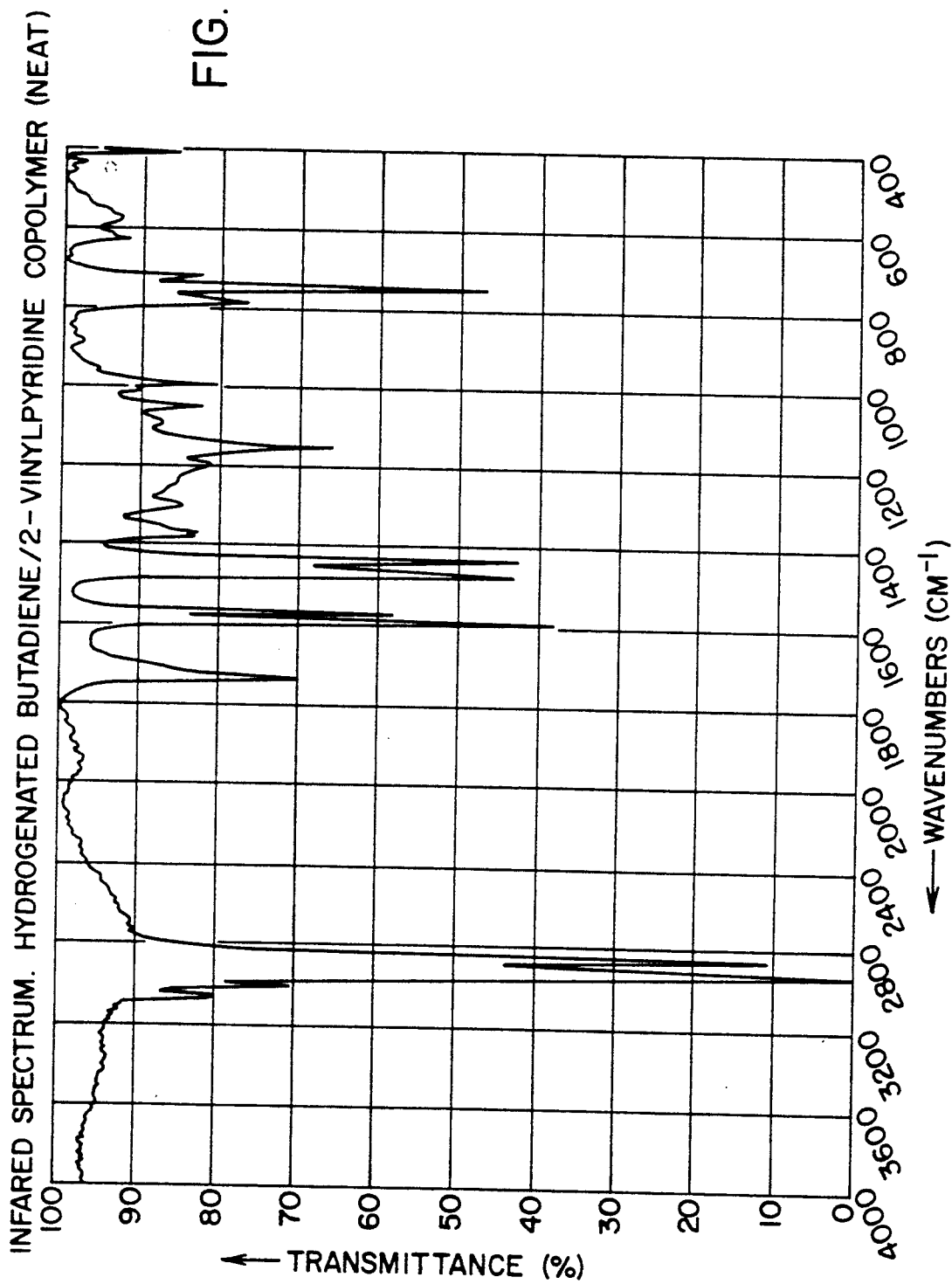
FIG. 10 is a graph of the infrared spectrum of the hydrogenated copolymer of FIG. 9.

As described in Example 1, from FIG. 10, the moles of copolymerized butadiene would be represented by an area of $$\frac{0.18}{2} + \left(1 - \frac{0.18}{2}\right)/2 = 0.55$$

CALCULATION OF THE MOLE PERCENT OF COPOLYMERIZED METHYL ACRYLATE IN THE HYDROGENATED COPOLYMER:

The area representing the moles of copolymerized methyl acrylate is 0.6/3 or 0.2 (0.6 is the area due to protons of the

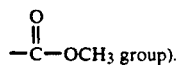
$-\overset{O}{\underset{\|}{C}}-OCH_3$ group).

$$\text{Mole percent of butadiene copolymerized} = \frac{0.55}{0.55 + 0.2} = 73.3$$

or $$\frac{0.55 \times 54}{(0.55 \times 54) + (0.2 \times 86)} = 63.3 \text{ wt. percent}$$

The mole percent of methyl acrylate in the copolymer is 26.7 or 36.7 wt. percent.

From formula 5 and the absorptions of the vinyl and methyl protons, the expected area in the aliphatic proton region (1.10–2.46) can be calculated.

| UNIT | ALIPHATIC PROTON AREA EXPECTED |
|---|---|
| Butadiene copolymerized in a 1,2 fashion | 3 × area of 1 $H_d$ proton = 3 × 0.09 = 0.27 |
| Butadiene copolymerized in a 1,4 fashion | 4 × area of 1 $H_a$ proton = 4 × 0.46 = 1.84 |
| Copolymerized methyl acrylate | 3 × area of 1 proton of methoxy group = 3 × 0.2 = 0.6 |

Total Area Expected = 1.84 + 0.27 + 0.6 = 2.71

This is close to the observed area of 2.72. The end groups, which also contribute to the aliphatic region of the spectrum, have been neglected.

Figure 12:
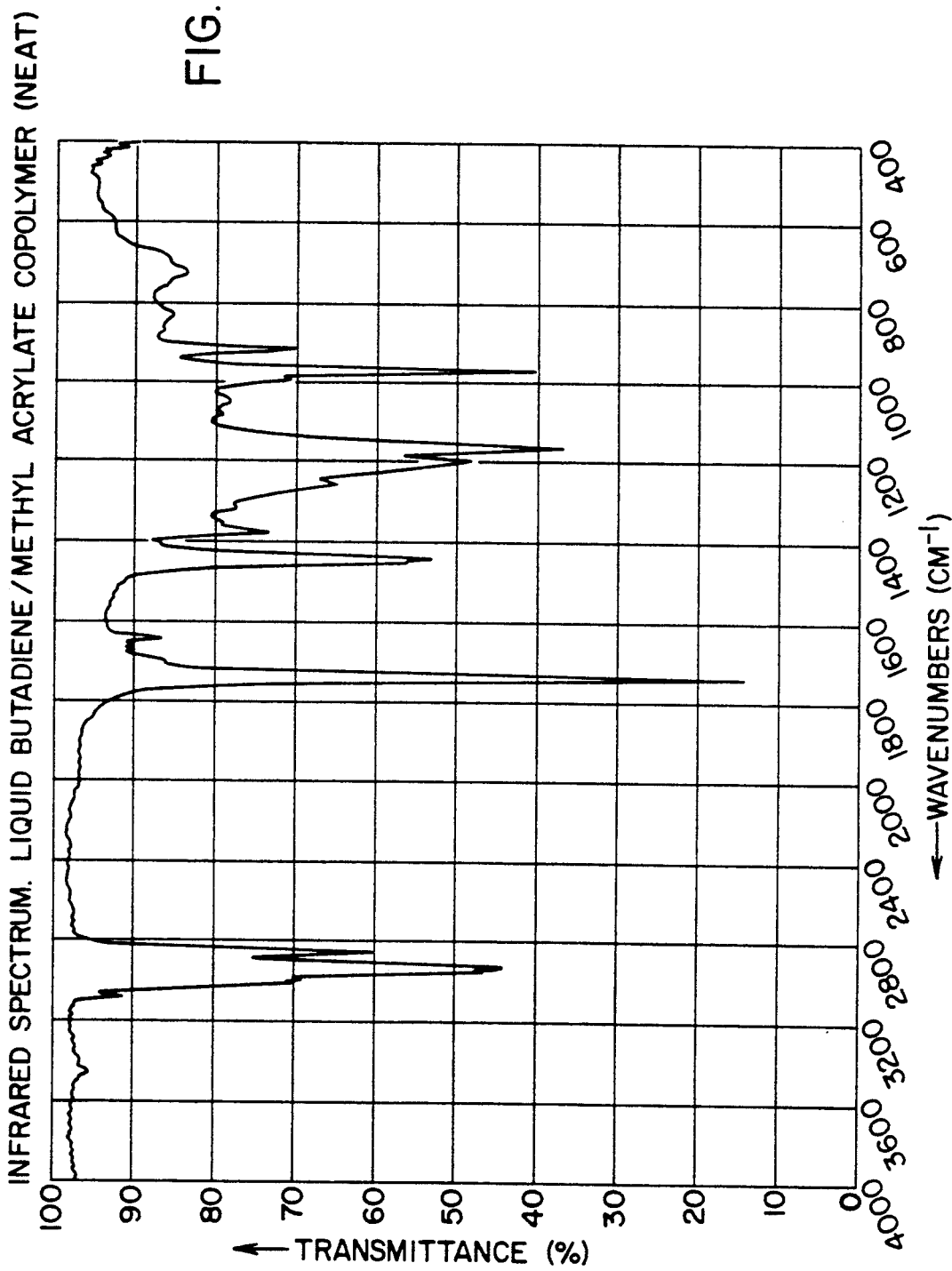
FIG. 12 is a graph of the infrared spectrum of the copolymer of FIG. 11.

The infrared spectrum of the copolymer (FIG. 12) displays the C=O stretching frequency of the ester groups at 1740 cm$^{-1}$, the out-of-plane olefinic C-H bend of the trans 1,4 copolymerized butadiene unit at 970 cm$^{-1}$, and the absorption due to the olefinic C-H bend of the 1,2 copolymerized butadiene at 915 cm.

EXAMPLE 4

HYDROGENATION OF A LIQUID BUTADIENE/METHYL ACRYLATE COPOLYMER

Using a procedure similar to the one described in Example 2, the liquid butadiene/methyl acrylate copolymer of Example 3 was hydrogenated to yield a gooey off-white solid.

Figure 13:
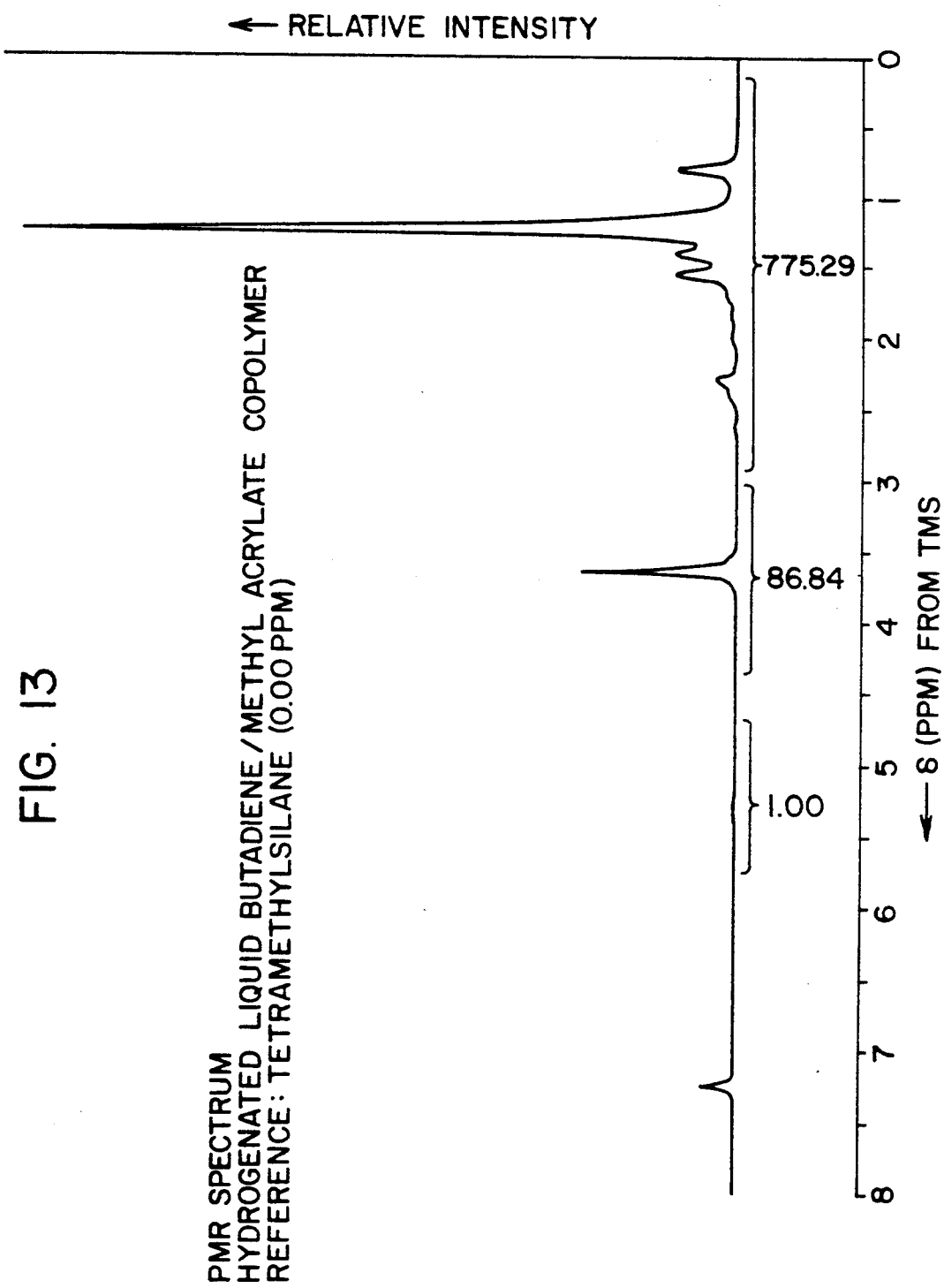
FIG. 13 is a graph of the proton magnetic resonance spectrum of a hydrogenated liquid butadiene/methyl acrylate liquid copolymer.

The proton magnetic resonance spectrum of the liquid butadiene/methyl acrylate copolymer is shown in FIG. 13. The copolymer structure, assuming complete hydrogenation of only the butadiene segments in the copolymer, is represented by formula 6.

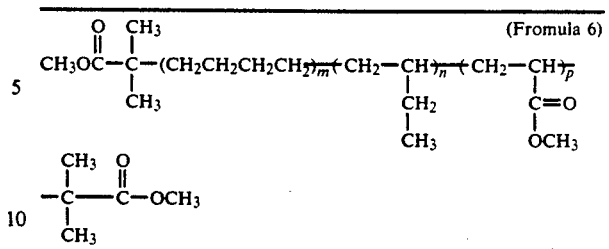
(Fromula 6)

| Absorption (ppm) | Assignment |
|---|---|
| 0.65–2.65 | Aliphatic protons, including those of end groups |
| 3.50–3.80 | $-\left(\begin{array}{c}CH_3\ O\\ \|\ \ \|\\ C-C-\\ \|\\ CH_3\end{array}\right)-$ Protons ($-\overset{O}{\underset{\|}{C}}-OCH_3$) from copolymerized methyl acrylate and end groups |
| 5.35 (trace) | Protons attached to residual carbon-carbon unsaturation |
| 7.25 | Chloroform impurity in the chloroform-d used in measurement of the spectrum |

An inspection of the pmr spectrum reveals only a trace of residual unsaturation in the copolymer.

Calculation of mole percent of methyl acrylate in the copolymer:

Area represented by the moles of methyl acrylate = (C—OCH$_3$ protons area)/3 = 86.84/3 = 28.94.

Aliphatic contribution from copolymerized methyl acrylate = 3 × 28.4 = 86.84 (see formula 6).

Aliphatic area observed = 775.29. Aliphatic contribution from hydrogenated butadiene segments = 775.29 − 86.84 = 688.45. Therefore, $$\text{the area representing moles of copolymerized butadiene} = \frac{688.45}{8} = 86.05$$

$$\text{Mole percent of copolymerized methyl acrylate} = \frac{28.94}{28.94 + 86.05} = 25.2$$

The FIG. 25.2 compares closely with the 26.7 mole percent of copolymerized methyl acrylate in the starting copolymer of Example 3. Hence, the methyl acrylate groups have been unaffected by the hydrogenation process, and the polar character of the polymer unchanged by hydrogenation.

Figure 14:
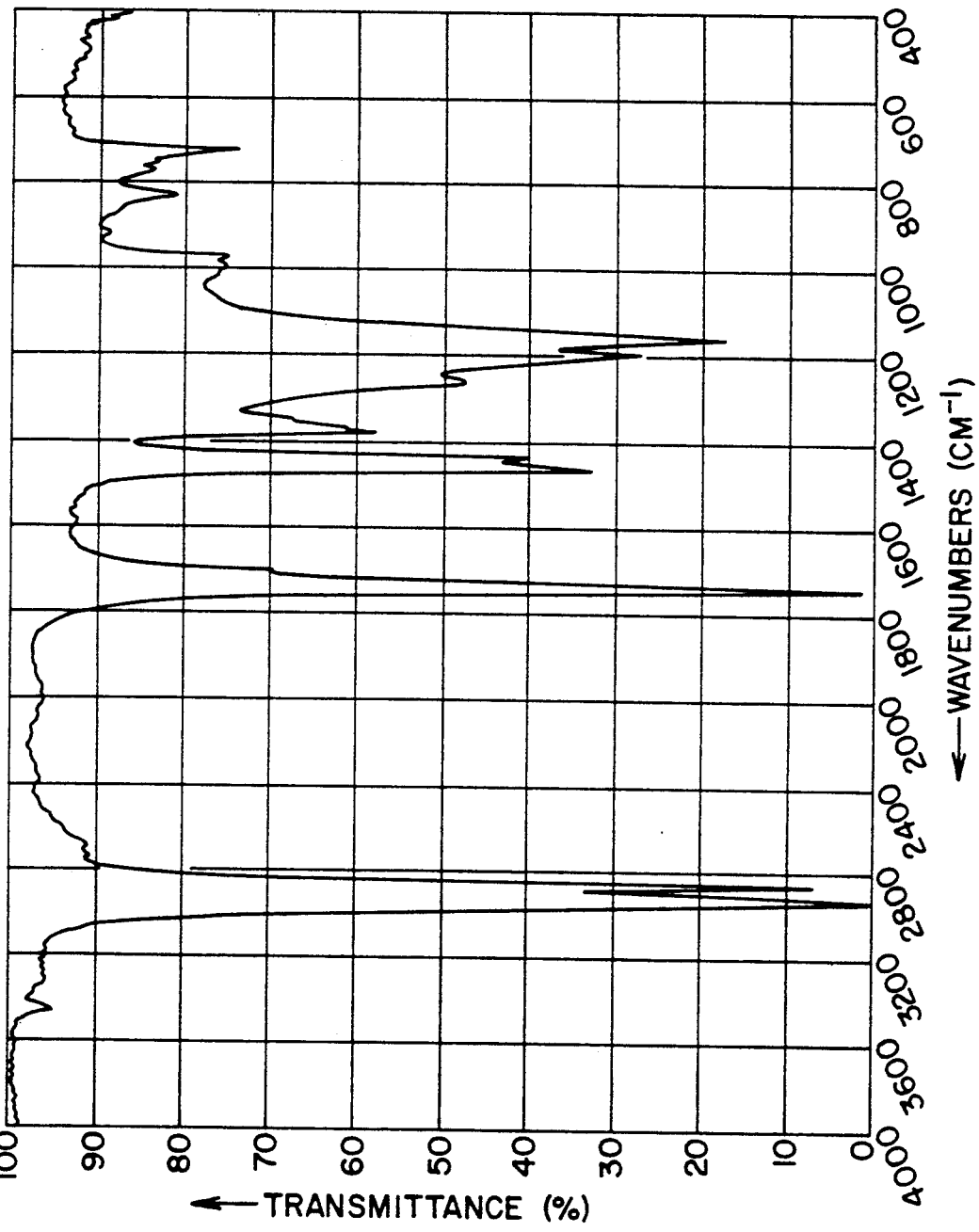
FIG. 14 is a graph of the infrared spectrum of the hydrogenated copolymer of FIG. 13.

The infrared spectrum (FIG. 14) of the hydrogenated copolymer reveals a drastic reduction of the bands at 970 and 915 cm$^{-1}$ due to the carbon-hydrogen bonds attached to carbon-carbon unsaturation. The ester carbonyl stretching frequency remains unaffected at 1740 cm$^{-1}$.

EXAMPLE 5

Synthesis of Dimethyl 2,2'-Polybutadienebis(isobutyrate)

The procedure of Example I was repeated with V-601 (0.972 lb.) and butadiene (31.0 lb.). Dimethyl 2,2'-polybutadienebis (isobutyrate), isolated as a colorless oil, is represented by Formula 7.

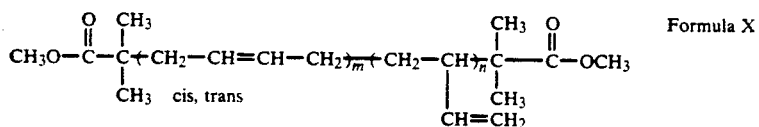

The polymer of formula 7 was hydrogenated as outlined in Example 4. The polymer solution was coagulated in methanol to recover a waxy solid represented by formula 8.

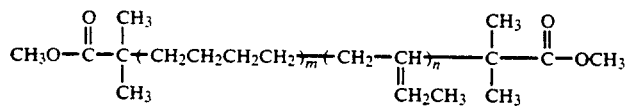

Comparison of the infrared spectrum of the product (FIG. 16) with that of the starting material (FIG. 15) indicates complete absence of the 970 and 915 cm$^{-1}$ absorptions due to carbon hydrogen bonds attached to carbon-carbon unsaturation. Hence, the polymer is fully saturated. The absorption due to the ester function remains unchanged at 1740 cm$^{-1}$.

While in accordance with the Patent Statutes, the best mode and preferred embodiments have been set forth, the scope of the invention is not limited thereto, but rather by the scope of the attached claims.

What is claimed is:

1. A method of preparing a heat-resistant hydrogenated polymer, comprising the steps of:

forming, by solution polymerization, a random copolymer having a cis-trans 1,4 microstructure from two monomeric classes wherein the first monomeric class is a conjugated diene or branched conjugated diene or mixtures thereof containing from 4 to 8 carbon atoms and the second monomeric class is of the general formula

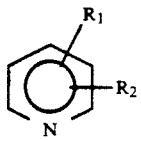

wherein $R_1$ is an alkenyl group containing from about 2 to about 8 carbon atoms, and $R_2$ is hydrogen or, an alkyl group containing from 1 to about 8 carbon atoms, with the proviso that up to about 20 percent by weight of said second monomeric class can be replaced with the general formula $CH_2=CR_3CX$ wherein $R_3$ is hydrogen or $CH_3$ and X is $-OOR_4$, $-ONR_5R_6$ or $-OOR_7OR_4$ wherein $R_4$ is an alkyl group containing from 1 to about 4 carbon atoms, $-CH_2CF_3$ or $-CH_2CF_2CF_2H$, $R_5$ and $R_6$ are independently alkyl groups containing from 1 to about 4 carbon atoms, and $R_7$ is an alkylene group containing from 1 to about 4 carbon atoms, wherein a solution polymerization catalyst is employed;

hydrogenating said random copolymer in the presence of a transition metal catalyst and further in the absence of boron trifluoride or boron trifluoride etherate.

2. The method of claim 1, wherein said conjugated diene is butadiene or isoprene, $R_1$ is an alkenyl group of two to six carbon atoms and $R_2$ is hydrogen, or an alkyl group of one to six carbon atoms; and wherein said random copolymer is hydrogenated in the presence of a trialkylaluminum reductant wherein the alkyl group contains from 1 to about 4 carbon atoms.

3. The method of claim 2, wherein the weight ratio of said first monomeric class to said second monomeric class is from 40-60:60-40.

4. The method of claim 3, wherein the solution polymerization initiator comprises a peroxide and an iron reductant.

5. The method of claim 4, wherein the transition metal catalyst is a cobalt or nickel salt and said trialkylaluminum reductant is triethylaluminum.

6. The method of claim 4, wherein the transition metal catalyst is a palladium, platinum or rhodium salt.

7. The method of claim 5, wherein $R_1$ is a vinyl group and $R_2$ is hydrogen or methyl.

8. The method of claim 7, wherein the weight ratio of said first monomeric class to said second monomeric class is from 55-60:45-40.

9. The method of claim 8, wherein at least 3 percent by weight of the second monomeric class is replaced with $CH_2=CR_3CX$.

10. The method of claim 9, Wherein X is $-OOR_4$, wherein $R_4$ is an alkyl group containing 1 carbon atom.

11. The method of claim 10, wherein $R_2$ is hydrogen or methyl.

12. The method of claim 11, wherein X is $-ONR_5R_6$, wherein $R_5$ and $R_6$ are alkyl groups containing 1 carbon atom.

13. The method of claim 12, wherein the cobalt catalyst is cobalt octoate or cobalt neodecanoate.

14. The method of claim 13, wherein the peroxide is cumene hydroperoxide or paramenthane hydroperoxide.

15. A method of preparing a heat-resistant hydrogenated polymer, which comprises:

forming, by solution polymerization, a random copolymer having a cis-trans 1,4 microstructure from two monomeric classes wherein the first monomeric class is a conjugated diene or branched conjugated diene or mixtures thereof containing from four to eight carbon atoms and the second monomeric class is polar and is of the general formula $CH_2=CR_8CX$ wherein $R_1$ is hydrogen or an alkyl group containing from 1 to about 4 carbon atoms and X is $-OOR_9$, $-ONR_{10}R_{11}$ or $-OOR_{12}OR_9$ wherein $R_9$ is an alkyl group containing from 1 to about 4 carbon atoms, $-CH_2CF_3$, or $-CH_2CF_3$, or $-CH_2CF_2CF_2H$, $R_{10}$ and $R_{11}$ are alkyl groups independently containing from 1 to about 4 carbon atoms and $R_{12}$ is an alkylene group containing from 1 to about 4 carbon atoms with the proviso that up to about 20 percent by weight of said second monomeric class can be replaced with the polar group having the general formula

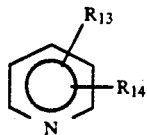

where $R_{13}$ is an alkenyl group containing from about 2 to about 8 carbon atoms and $R_{14}$ is hydrogen, or an alkyl group containing from 1 to about 8 carbon atoms, wherein a solution polymerization catalyst is employed; and hydrogenating said random copolymer in the presence of a transition metal catalyst and further in the absence of boron trifluoride or boron trifluoride etherate.

16. The method of claim 15, wherein said conjugated diene is butadiene or isoprene, $R_8$ is hydrogen or an alkyl group containing 1 carbon atom; and wherein said random copolymer is hydrogenated in the presence of a trialkylaluminum reductant wherein the alkyl group contains from 1 to about 4 carbon atoms.

17. The method of claim 16, wherein at least 3 percent by weight of the second monomeric class is replaced with

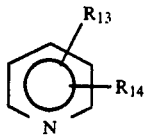

wherein $R_{13}$ is an alkenyl group containing from 2 to about 6 carbon atoms and $R_{14}$ is hydrogen or an alkyl group containing from 2 to about 6 carbon atoms.

18. The method of claim 17, wherein the weight ratio of said first monomeric class to said second monomer class is from 40–60:60–40.

19. The method of claim 18 wherein the solution polymerization initiator comprises a peroxide and an iron reductant.

20. The method of claim 19, wherein the transition metal catalyst is cobalt or nickel salt and said trialkylaluminum reductant is triethylaluminum.

21. The method of claim 19 wherein the transition metal catalyst is a palladium, platinum or rhodium salt.

22. The method of claim 20, wherein X is $-OOR_9$, and wherein $R_9$ is an alkyl group containing 1 carbon atom.

23. The method of claim 22, wherein $R_{13}$ is vinyl and $R_{14}$ is methyl.

24. The method of claim 23, wherein the weight ratio of said first monomeric class to said second monomeric class is 50–60:45–40.

25. The method of claim 24, wherein the peroxide is cumene hydroperoxide or paramenthane hydroperoxide.

26. The method of claim 25, wherein the cobalt catalyst is cobalt octoate or cobalt neodecanoate.

27. The method of claim 26, wherein X is $-ONR_{10}R_{11}$, wherein $R_{10}$ and $R_{11}$ are alkyl groups containing 1 carbon atom.

* * * * *